United States Patent [19]

Yamazoe et al.

[11] 4,443,380
[45] Apr. 17, 1984

[54] ORGANIC EUROPLUM SALT PHOSPHOR

[75] Inventors: Katsuhiko Yamazoe, Yokohama; Akira Yoshino, Fujisawa; Yoshiharu Kitahama, Kawasaki; Isamu Iwami, Zushi, all of Japan

[73] Assignee: Asahi-Dow Limited, Tokyo, Japan

[21] Appl. No.: 180,324

[22] Filed: Aug. 22, 1980

[30] Foreign Application Priority Data

Aug. 31, 1979 [JP] Japan .................. 54-110357
Jul. 8, 1980 [JP] Japan .................. 54-92214

[51] Int. Cl.³ .......................... C09K 11/46
[52] U.S. Cl. .................. 260/429.2; 252/301.16; 252/301.36
[58] Field of Search ............ 252/301.16, 301.36; 260/429.2

[56] References Cited

U.S. PATENT DOCUMENTS 2,901,496 8/1959 Cowan .............. 260/429.1

FOREIGN PATENT DOCUMENTS 1717194 7/1971 Fed. Rep. of Germany .
898263 4/1945 France .
197710 11/1977 U.S.S.R. .............. 260/429.2

OTHER PUBLICATIONS

Zolin et al., Chemical Abstracts, vol. 78, Abstract 78:64564e (1973).
Chemical Abstracts, vol. 78, p. 482, 57960c (1973), entitled "Rare Earth Element Cinnamates" by Samoilovich-Sinitsyna et al.
Chemical Abstracts, vol. 66, p. 8547, 91441m (1967), entitled "Cinnamic Acid in Analytical Chemistry", by Ostroumov et al.
Chemical Abstracts, vol. 69, p. 10586, 113182d, (1968), entitled "Use of Cinnamic Acid in Analytical Chemistry", by Ostroumov et al.

Primary Examiner—F. Edmundson
Attorney, Agent, or Firm—Armstrong, Nikaido, Marmelstein & Kubovcik

[57] ABSTRACT

Rare-earth metal salts of organic carboxylic acids of this invention constitute themselves phosphors which exhibit unusually high luminescence efficiency, excel in chemical and physical stability and weatherability, show high affinity for other chemical substances and promise extensive usefulness in the field of high-performance luminescent products.

4 Claims, 3 Drawing Figures

ORGANIC EUROPLUM SALT PHOSPHOR

BACKGROUND OF THE INVENTION

1. Field of the Invention

This invention relates to phosphors capable of emitting radiation at high efficiency when subjected to ultraviolet radiation, X-rays, electron bombardment or some other forms of excitation, and particularly to phosphors useful as luminescent materials, illuminating materials, photosensitive materials, display materials, sensitizing materials, photographic materials, image-resolving materials and basic materials for optoelectronics field.

2. Description of the Prior Art

Phosphor compositions activated with rare-earth elements have already been put to practical use as red-dot phosphors in color television cathode-ray tubes or color kinescopes. Substantially all of the phosphor compositions which have been put to practical use are inorganic compounds. As an example of such inorganic compounds, an inorganic compound typified by the compound of the formula $(Y_{1-x}Eu_x)_2O_2S$ which is disclosed in Japanese Patent Publication No. 13242/1972 may be cited. The aforementioned $(Y_{1-x}Eu_x)_2O_2S$ is the compound of the ceramic matrix $Y_2O_2S$ (yttrium oxysulfide) doped with the activator Eu (europium), one of the rare-earth elements. Since the phosphors activated with rare-earth elements produce characteristic narrow and sharp line emission spectra, they are drawing amounting attention as basic materials, for example, for application to the field of color television systems and lasers which are expected to provide chromaticities of extremely high levels of purity, namely the field of high-function phosphor. The ceramic phosphors activated with transition metal elements including rare-earth elements such as, for example, europium, have a disadvantage that they do not produce effective luminescence unless the optimum matrixes comprising a proper metal element capable of substituting the metal element used as the activator and an inorganic substance used as the matrix including the proper metal element (corresponding to the yttrium oxysulfide disclosed in Japanese Patent Publication No. 13242/1972) are selected quite appropriately. No fundamental knowledge has yet been acquired concerning the interrelations between the activating elements, matrixes and luminescent efficiencies. Worse still, in the synthesis of practically satisfactory ceramic phosphor compositions, the selection of combinations between their component elements and activating elements is extremely difficult for the reason indicated above and the process for their manufacture has a fatal drawback that, because of the complication of procedure involving a pretreatment, calcination at elevated temperatures, annealing, several cycles of sintering and aftertreatment, it hardly befits mass production. Moreover, the operation for transparentization necessitates an elaborate and complicate technique and the equipment and conditions for the production themselves are difficult of effective application to large products and the costs of production are extremely high. Thus, a number of drawbacks are suffered also in terms of manufacturing process and product quality. Further in terms of application, independent use of ceramic phosphors is restricted. Such phosphors prove useful in rigidly limited forms for virtually all of them acquire their significance only in the presence of binders such as of plastic materials. Naturally, it is impracticable for the phosphors to be effectively used in liquid state in which they are dissolved in certain kinds of organic solvents.

With a view to overcoming the various drawbacks mentioned above, extensive studies have been conducted in the phase of organics, namely on the phosphors of organic rare-earth compound typified by rare-earth metal chelates, incorporating $\beta$-diketones [e.g., K. C. Joshi et al, Journal of Inorganic and Nuclear Chemistry, 35 (9) 3161, (1973)] as the ligand, for example. As the result, some of the phosphors have been demonstrated to possess a potentiality of laser oscillation and exhibit luminescence at high efficiency. The methods for their production, however, are very complicate and hardly feasible and are scarcely fit to mass production. For practical use as phosphors, the products by these methods suffer from fatal chemical and physical drawbacks such as excessively inferior thermal stability and ready degradation of the luminescent ability due to chemical decomposition with lapse of time, for example.

Another approach to the problem has been made through studies on systems using organic carboxyl groups. Examples of the studies reported in literature are:

(1) V. F. Zolin et al., Zh. Prikl. Spektrosk., 17 (1) 71 (1972)

(2) V. F. Zolin et al., Optics and Spectroscopy, 33 (5) 509 (1972)

(3) N. A. Kazanskaya et al., Optics and Spectroscopy, 28 (6) 619 (1970)

(4) V. L. Ermolaev et al., Optics and Spectroscopy, 28 (1) 113 (1970)

(5) "Sinha, S. P.: Z. Naturforsch, 20a 319 (1965)" cited in Molecular Crystals, 1 37 (1966)

(6) H. G. Brittain, Inorganic Chemistry, 17 2762 (1978)

As dealt with in these articles of literature, the systems in question are chelate-like compounds similar to the aforementioned $\beta$-diketone chelates. These compounds have a disadvantage that they possess poor thermal stability and suffer from degradation of their luminescent through a change on standing. Substantially all of these compounds are soluble in water. The reports treat of the transfer of energy in aqueous solutions and the phenomenon of luminescence occurring in consequence of the energy transfer.

SUMMARY OF THE INVENTION

This invention is directed to a novel organic rare-earth salt phosphor comprising a crystalline rare-earth metal salt of an organic carboxylic acid represented by the general formula:

$$[A(COO)_l]_m Z$$

wherein A denotes an organic group possessing at least three conjugate groups capable of conjugating with a carboxyl group, $[A(COO)_l]$ denotes a carboxylic acid radical derived from an organic carboxylic acid $[A(COOH)_l]$, Z denotes $(L_x M_y{}^{3+} M^{2+}{}_{1-x-y})$, $l$ denotes 1, 2 or 3, $m = 1/l \, (x+y+2)$, L is one rare-earth element, $M^{3+}$ is at least one trivalent metal element, $M^{2+}$ is at least one divalent metal element, x is a value within the range of $0.04 \leq x \leq 1$, such that $[A(COO)_l]_m Z$ is a doped salt when x falls within the range of $0.04 \leq x < 1$ and $Z = L$ when $x = 1$.

DETAILED DESCRIPTION OF THE INVENTION

Figure 1:
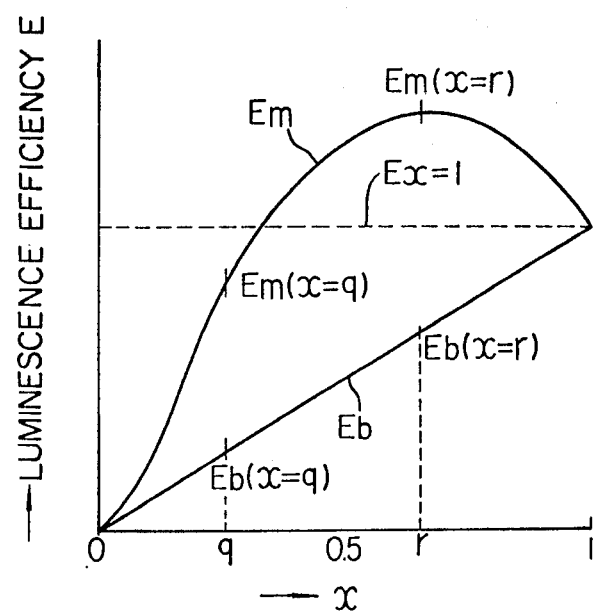
FIG. 1 is a graph showing the synergistic effect of the luminescence efficiency conducted on a crystalline rare-earth metal doped salt of an organic carboxylic acid according to the present invention as the function of the rare-earth metal content, compared with a merely physical mixture of a crystalline rare-earth metal salt of an organic carboxylic acid with a crystalline metal salt of an organic carboxylic acid. In the graph, the curve $E_m$ represents the doped salt, $[A(COO)_i]_m (L_x M_1^{2+}{}_{-x})$ (wherein y=0), and the curve $E_b$ the mixed salt, $x[A(COO)_i]_m L-(1-x) [A(COO)_i]_m M^{2+}$ (wherein y=0), with "x" respectively as the variable.

The inventors have made a diligent study on the phosphor compositions of rare-earth metal salts of organic carboxylic acids heretofore held to be very difficult to obtain high luminescence efficiency phosphors, in an effort to develop an epochal phosphor which exhibits highly efficient luminescence fit to practical use, has good thermal, chemical and physical stability and permits mass production very easily. They have consequently brought this study to successful completion with a discovery that some crystalline rare-earth salts of an organic carboxylic acid which comprises an organic carboxylic acid radical possessing a carboxyl group bonded to a specific organic group and at least one rare-earth element possesses a high energy converting ability and can constitute themselves excellent phosphors.

A further study of the aforementioned phosphors conducted on the basis of the knowledge has led to a discovery that crystalline rare-earth metal doped salts of an organic carboxylic acid obtained by reacting a specific rare-earth element and a specific metal element with an organic carboxylic acid radical having a carboxyl group bonded to a specific organic group as defined by the present invention also exhibits a high luminescence efficiency. And, owing to the use of the specific metal element, the crystalline rare-earth metal doped salt of an organic carboxylic acid possesses a higher luminescence efficiency than a merely physical mixture of a crystalline rare-earth metal salt of an organic carboxylic acid with a crystalline metal salt of an organic carboxylic acids at an identical metal percentage composition (as represented by the general formula, $x[A(COO)_i]_m L-(1-x)[A(COO)_i]_m M^{2+}$, for example). Further, when the doped salt has the rear-earth metal content within a specific range, the luminescence efficiency exhibited by this doped salt is synergistic compared with that exhibited by the phosphor which is formed merely of a crystalline rare-earth metal salt of an organic carboxylic acid. The present invention has issued from the combination of the various knowledges described above.

This invention, therefore, aims to provide novel phosphors comprising a crystalline rare-earth metal salt of an organic carboxylic acid represented by the general formula:

$$[A(COO)_i]_m Z$$

The phosphor exhibits an outstanding function of luminescence when it satisfies the following requirements.

In the general formula mentioned above, A denotes an organic group possessing at least three conjugate groups capable of conjugating with a carboxyl group, $[A(COO)_i]$ denotes a carboxylic acid radical derivable from an organic carboxylic acid $[A(COOH)_i]$, Z denotes , 1 denotes 1, 2 or 3 and m denotes 1/1 (x+y+2) where L is one member selected from the rare-earth element group consisting of cerium, praseodymium, neodymium, samarium, europium, terbium, dysprosium, erbium, holmium, thulium and ytterbium, $M^{3+}$ is at least one trivalent metal element selected from the group consisting of yttrium, lanthanum, gadolinium and lutetium, $M^{2+}$ is at least one divalent metal element selected from the group consisting of calcium, strontium and barium, x is a value within the range of $0.04 \leq x \leq 1$, such that $[A(COO)_i]_m Z$ is the state of a doped salt when x falls within the range of $0.04 \leq x < 1$ and Z=L when x=1, the organic carboxylic acid $[A(COOH)_i]$ is an α,β-unsaturated carboxylic acid, 2-thiophenecarboxylic acid, 3-thiophenecarboxylic acid, m-toluic acid or p-toluic acid where Z is europium and the organic carboxylic acid $[A(COOH)_i]$ is m-toluic acid, p-toluic acid, isophthalic acid, terephthalic acid or picolinic acid where Z is terbium.

The primary prerequisite for the phosphor of the present invention is that it should comprise a salt of an organic carboxylic acid defined by the aforementioned general formula and the organic group A should possess at least three conjugate groups capable of conjugating with a carboxyl group.

The term "organic group A" as used in this invention means to refer to the class of organic groups containing conjugate groups such as are indicated in (1) through (4) below which are capable of conjugating with one to three carboxyl groups. This organic group is required to contain at least three conjugate groups selected from those of the types (1) through (4). If the phosphor composition has two or less conjugate groups in its conjugate system as indicated by the formula $CH_3-(CH=CH)_2-COOH$, for example, the luminescence efficiency is notably poor as compared with the composition which has three or more conjugate groups. In other words, the effect of the present invention is manifested only when the total number of conjugate groups contained in the composition is not less than 3.

The conjugate groups mentioned above are classified into the following four types (1) through (4).

(1) The π conjugate groups such as are indicated below.

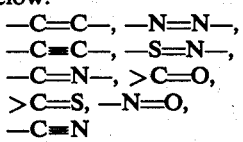

(2) The conjugate groups containing lone electron pairs such as are indicated below and are capable of mainly forming heterocyclic rings.

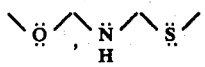

(3) The conjugate groups containing lone electron pairs such as are indicated below (providing that x denotes a halogen atom).

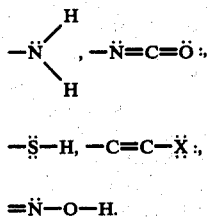

(4) The group as indicated below.

The term "conjugate" as used in this invention is based on the entry "conjugate system" in page 332 of the "Physical and Chemical Dictionary" (edited by Bunichi Tamamushi et al. and published by Iwanami Shoten on Apr. 5, 1976; third edition, seventh printing), which is defined as "Generic term for molecules or free radicals involving resonance of several structures without local presence of multiple bonds; those possessing conjugate double bonds being typical examples, with unpaired electron or lone pair occasionally participating in the resonance in the place of double bonds." It is provided, however, that the term "hyperconjugation" touched upon in the same entry and in page 845 of the same dictionary is not to be embraced in the "conjugate group" as involved in the present invention.

In the present invention, therefore, the total number of conjugate groups is defined so that each one of the groups as are indicated in the aforementioned four types (1)–(4) is reckoned as one.

Where the value of the variable x in the aforementioned general formula defining the crystalline rare-earth metal doped salt of an organic carboxylic acid falls within the range of $0.04 \leq x < 1$, the organic group represented as A is desired to be a substituted or unsubstituted aliphatic or aromatic hydrocarbon group, a quinone type residue or a heterocyclic group containing at least one nitrogen or sulfur atom as a hetero atom.

In this case, the aromatic hydrocarbon group is desired to be a phenyl group.

Optionally, the organic group A may be substituted with a substituent incapable of impeding the conjugation, such as, for example, an alkyl group, phenyl group, alkoxyl group, nitro group, or a halogen atom such as fluorine atom or chlorine atom.

Of the aforementioned substituents usable in the substituted aromatic hydrocarbon group, particularly desirable are alkyl group and alkoxyl group. The alkyl group is desired to be methyl group or ethyl group and the alkoxyl group to be methoxyl group or ethoxyl group.

Typical examples of the organic carboxylic acids [A(COOH)$_l$] in which the organic group A is a substituted aliphatic hydrocarbon group are α,β-unsaturated carboxylic acids.

It is noteworthy that these substituents bring about better results when their incorporation is made at the m-position or p-position in the carboxyl group than at the o-position.

Examples of the organic carboxylic acids represented by the aforementioned generic formula, A(COOH)$_l$, include aliphatic carboxylic acids such as 2,4,6-octatrienoic acid and 2,4,6,8-decatetraenoic acid and substitution products thereof; aromatic carboxylic acids such as m-toluic acid, p-toluic acid, p-ethylbenzoic acid, m-methoxybenzoic acid, p-methoxybenzoic acid, m-chlorobenzoic acid, p-chlorobenzoic acid, p-bromobenzoic acid, dichlorobenzoic acid, p-ethoxybenzoic acid, m-nitrobenzoic acid, cuminic acid (p-isopropylbenzoic acid), p-tert-butylbenzoic acid, 4-benzoylbenzoic acid, 4-biphenylcarboxylic acid, phenylpropiolic acid, 2-chloro-6-fluorobenzoic acid, α-bromo-p-toluic acid, isophthalic acid, terephthalic acid, trimellitic acid and substitution products thereof; polycyclic aromatic carboxylic acids such as anthracene-9-carboxylic acid and anthraquinonecarboxylic acid and substitution products thereof; heterocyclic carboxylic acids such as 2-thiophenecarboxylic acid, 3-thiophenecarboxylic acid, nicotinic acid, picolinic acid, indol-5-carboxylic acid, pyridine-2,5-dicarboxylic acid, pyridine-3,4-dicarboxylic acid, 2-phenyl-4-quinolinecarboxylic acid, guanaldic acid and 5-methyl-2-thiophenecarboxylic acid and substitution products thereof; and α,β-unsaturated carboxylic acids such as 3-indolacrylic acid, 4-imidazoleacrylic acid, 3-(2-thienyl)acrylic acid, β-(3-pyridyl)acrylic acid, 2,3-bis(p-methoxyphenyl)acrylic acid, cinnamic acid, p-methylcinnamic acid, α-methylcinnamic acid, m-chlorocinnamic acid, m-bromocinnamic acid, p-chlorocinnamic acid, 3,5-dimethoxycinnamic acid, and 3,4-dihydroxycinnamic acid; and carboxylic acids such as crocetin, bixin and azafrin and substitution products thereof. Of these organic carboxylic acids, particularly desirable are m-toluic acid, p-toluic acid, p-ethylbenzoic acid, m-methoxybenzoic acid, p-methoxybenzoic acid, p-ethoxybenzoic acid, cuminic acid, phenylpropiolic acid, terephthalic acid, isophthalic acid, 2-thiophenecarboxylic acid, 3-thiophenecarboxylic acid, picolinic acid, cinnamic acid, 3,5-dimethoxycinnamic acid, p-methylcinnamic acid and β-(3-pyridyl)acrylic acid. Of these particularly desirable organic carboxylic acids, preferable are m-toluic acid, p-toluic acid, isophthalic acid, terephthalic acid, cinnamic acid, 3,5-dimethoxycinnamic acid and β-(3-pyridyl)acrylic acid. These organic carboxylic acids are desired to be colorless.

The rear-earth element L in the aforementioned general formula defining the phosphors of the present invention is to be one member selected from the group consisting of cerium, praseodymium, neodymium, samarium, europium, terbium, dysprosium, holmium, erbium, thulium and ytterbium. Of these rare-earth elements, particularly desirable are samarium, europium, terbium and dysprosium. Preferred choices of these particularly desirable examples are europium and terbium.

The metal element $M^{3+}$ contemplated by this invention is at least one trivalent metal element selected from the group consisting of yttrium, lanthanum, gadolinium and lutetium, preferably from the group consisting of yttrium, lanthanum and gadolinium. The metal element $M^{2+}$ contemplated by the present invention is at least one divalent metal element selected from the group consisting of calcium, strontium and barium.

Where Z in the general formula of the doped salt comprises two components as indicated $(L_xM_y{}^{3+})$ (wherein, $x+y=1$), desirable results are obtained by combining europium as L with yttrium, lanthanum or gadolinium as $M^{3+}$ or by combining terbium as L with yttrium, lanthanum or gadolinium as $M^{3+}$.

Where Z in the general formula comprises two components as indicated $(L_xM_1{}^{2+}{}_{-x})$ (wherein, $Y=0$), desirable results are obtained by combining europium as L with calcium, strontium or barium as $M^{2+}$ or by combining terbium as L with calcium, strontium or lanthanum as $M^{2+}$.

Where Z in the general formula comprises three components as indicated $(L_xM_y{}^{3+})$, with $M^{3+}$ denoting a combination of two different trivalent metal elements (wherein, $x+y=1$), desirable results are obtained by combining europium as L with two members selected from the group consisting of yttrium, lanthanum and gadolinium as $M^{3+}$ or by combining terbium as L with two members selected from the group consisting of yttrium, lanthanum and gadolinium as $M^{3+}$.

Where Z in the general formula comprises three components as indicated $(L_xM_1{}^{2+}{}_{-x})$, with $M^{2+}$ denoting a combination of two different divalent metal elements (wherein $Y=0$), desirable results are obtained by combining europium as L with two members selected from the group consisting of calcium, strontium and barium as $M^{2+}$ or by combining terbium as L with two members selected from the group consisting of calcium, strontium and barium as $M^{2+}$.

Where Z in the general formula comprises three components as indicated $(L_xM_y{}^{3+}+M_1{}^{2+}{}_{-x-y})$, desired results are obtained by combining europium as L with one member selected from the group consisting of calcium, strontium and barium as $M^{2+}$ and one member selected from the group consisting of yttrium, lanthanum and gadolinium as $M^{3+}$, or by combining terbium as L with one member selected from the group consisting of calcium, strontium and barium as $M^{2+}$ and one member selected from the group consisting of yttrium, lanthanum and gadolinium as $M^{3+}$.

The doped salt of the present invention is the type of salt which, as is evident from the X-ray powder diffraction pattern, has part of the rare-earth element L substituted with a metal element $M^{3+}$ and/or a metal element $M^{2+}$, and it is no mere physical mixtures. The doped salt of the present invention is such that the variable "x" in the aforementioned general formula falls within the range of $0.04 \leq x < 1$. The decided advantage of the doped salt over the mixed salt becomes quite conspicuous when x falls within this range $0.04 \leq x < 1$. When x falls within the range of $0 < x < 0.04$, for example, the doped salt manifests substantially no advantage over the mixed salt, shows a very low luminescence efficiency and, therefore, proves completely disadvantageous even from the standpoint of practical use. The doped salt manifests its advantageous effect and provides a practically satisfactory phosphor substance fully only when the variable "x" falls within the range of $0.04 \leq x < 1$. A more desirable range for x is $0.15 \leq x < 1$ and the most desirable range for x is $0.35 \leq x < 1$.

Specific examples of the crystalline rare-earth metal doped salts of organic carboxylic acids defined as described above include europium or terbium doped salts of alkyl- or alkoxy-substituted aromatic carboxylic acids, europium or terbium doped salts of sulfur- or nitrogen-containing heterocyclic carboxylic acids, europium doped salts of polycyclic carboxylic acids, and europium doped salts of $\alpha,\beta$-unsaturated carboxylic acids.

More specifically, examples of desirable doped salts for the purpose of this invention are $(Eu_xM_y{}^{3+}+M_1{}^{2'}{}_{-x-y})$m-toluate, $(Eu_xM_y{}^{3+}+M_1{}^{2+}{}_{-x-y})$p-toluate, $(Tb_xM_y{}^{3+}+M_1{}^{2+}{}_{-x-y})$m-toluate, $(Tb_xM_y{}^{3+}+M_1{}^{2+}{}_{-x-y})$p-toluate, $(Eu_xM_y{}^{3+}+M_1{}^{2+}{}_{-x-y})$ p-ethylbenzoate, $(Tb_xM_y{}^{3+}+M_1{}^{2+}{}_{-x-y})$ p-ethylbenzoate, $(Eu_xM_y{}^{3+}+M_1{}^{2+}{}_{-x-y})$ m-methoxybenzoate, $(Eu_xM_y{}^{3+}+M_1{}^{2+}{}_{-x-y})$ p-methoxybenzoate, $(Eu_xM_y{}^{3+}+M_1{}^{2+}{}_{-x-y})$ terephthalate, $(Eu_xM_y{}^{3+}+M_1{}^{2+}{}_{-x-y})$ isophthalate, $(Eu_xM_y{}^{3+}+M_1{}^{2+}{}_{-x-y})$ 2-thiophenecarboxylate, $(Eu_xM_y{}^{3+}+M_1{}^{2+}{}_{-x-y})$ 3-thiophenecarboxylate, $(Eu_xM_y{}^{3+}+M_1{}^{2+}{}_{-x-y})$ picolinate, $(Tb_xM_y{}^{3+}+M_1{}^{2+}{}_{-x-y})$ picolinate, $(Eu_xM_y{}^{3+}+M_1{}^{2+}{}_{-x-y})$ cinnamate, $(Eu_xM_y{}^{3+}+M_1{}^{2+}{}_{-x-y})$ 3,5-dimethoxycinnamate, $(Eu_xM_y{}^{3+}+M_1{}^{2+}{}_{-x-y})$ p-methylcinnamate and $(Eu_xM_y{}^{3+}+M_1{}^{2+}{}_{-x-y})$ $\beta$-(3-pyridyl) acrylate (wherein, $M^{3+}$ is at least one member selected from the group consisting of yttrium, lanthanum and gadolinium and $M^{2+}$ is at least one member selected from the group consisting of calcium, strontium and barium).

Where the variable "x" in the general formula defining the salt of the present invention has the value of 1, the organic carboxylic acid represented by the formula, $[A(COOH)_i]$, is an $\alpha,\beta$-unsaturated carboxylic acid, 2-thiophenecarboxylic acid, 3-thiophenecarboxylic acid, m-toluic acid or p-toluic acid when L is europium; and the aforementioned organic carboxylic acid is m-toluic acid, p-toluic acid, isophthalic acid, terephthalic acid or picolinic acid when L is terbium.

Specific examples of $\alpha,\beta$-unsaturated carboxylic acids are cinnamic acids, 3,5-dimethoxycinnamic acid, p-methylcinnamic acid, p-chlorocinnamic acid, $\alpha$-methylcinnamic acid, 3,4-dihydroxycinnamic acid, m-bromocinnamic acid and $\beta$-(3-pyridyl)acrylic acid. Cinnamic acid, 3,5-dimethoxycinnamic acid and $\beta$-(3-pyridyl)acrylic acid are more preferable among these described above.

Of the crystalline rare-earth metal salts of organic carboxylic acids which satisfy $x=1$ in the aforementioned general formula, europium cinnamate, europium 3,5-dimethoxycinnamate, europium $\beta$-(3-pyridyl)acrylate, europium 2-thiophenecarboxylate, europium 3-thiophenecarboxylate, europium m-toluate, europium p-toluate, terbium isophthalate, terbium terephthalate, terbium picolinate, terbium m-toluate and terbium p-toluate exhibit particularly advantageous luminescence efficiency.

The doped salts exhibit outstanding luminescence efficiency similarly to the crystalline rare-earth metal salts of organic carboxylic acids enumerated above.

It deserves special mention that the doped salt possesses a higher luminescence efficiency than the merely physical mixture having the same metal percentage composition and consisting of a crystalline rare-earth metal salt of an organic carboxylic acid and a crystalline metal salt of an organic carboxylic acid, as represented by the following general formula, $x[A(COO)_l]_mL-(1-x) [A(COO)_l]_mM^{2+}$. Moreover, when the ratio of L to $M^{2+}$ of the doped salt falls within a specific range, the luminescence efficiency of the doped salt is higher than that of a mere crystalline rare-earth metal salt of an organic carboxylic acid, that is, the doped salt shows synergistic effect distinctly.

Specifically as illustrated in FIG. 1, generally in the case of a merely physical mixture, the luminescence efficiency linearly decreases with the increasing content of the metal element M (i.e. the decreasing of x) as typified by the curve $E_b$ in the diagram showing the change of the luminescence efficiency from the luminescence efficiency ($E_{x=1}$) of a mere crystalline rare-earth metal salt of an organic carboxylic acid. In the case of the doped salt obtained by the present invention, it is a surprise that the luminescence efficiency is higher than a merely physical mixture in the specific range of $0.04 \leq x < 1$, as represented by the curve $E_m$ in the diagram. Further when the value of x falls within another specific range, the doped salt obtained by the present invention manifests a notable synergistic effect in its luminescence efficiency as compared with the luminescence efficiency obtainable by the physical mixture.

For example, as shown in the diagram, $E_m$ and $E_b$ clearly indicate the relationship of $E_m > E_b$ where the metal composition ratio is identical as $x=q$ and the relationship of $E_m > E_{x=1} > E_b$ where the metal composition ratio is identical as $x=r$.

The effect of this invention is manifested only when the crystalline doped salt is obtained by the reaction of the specific organic carboxylic acid radical with the rare-earth element and the metal element as defined by this invention.

When this reaction is carried out by using metal elements other than those of the group defined by the present invention, the salt consequently obtained manifests notably poor or even absolutely no luminescence.

Further characteristically, notwithstanding the independent crystalline salts of the metal elements $M^{3+}$ and $M^{2+}$ totally lack the ability of luminescence (providing that where $M^{3+}=Gd$, it possesses a luminescent level but the difference between the luminescent level of Gd and that of the L is decidedly large), the doped salt obtained by the present invention at times manifests the synergistic effect as compared with the mere crystalline salt of a rare-earth element L.

Heretofore in the art of ceramics, the combination of $Sb^{3+}$ and $Mn^{2+}$ in the composition of $(Ca,Sb^{3+},Mn^{2+})_5(PO_4)_3(F,Cl)$, the combination of Yb and Nd in the composition of $L_{1-x-y}Nd_xYb_yZ$ disclosed in Japanese Published Unexamined Patent Application No. 100991/1979, or the combination of $Ce^{3+}$ and $Tb^{3+}$ (G. Blasse and A. Bril, J. Chem. Phys., 51(8) 3252 (1969), etc.) and, among the organic compounds of rare-earth elements, the specific combination $Tb^{3+}$ and $Eu^{3+}$ in solutions have been known to cause the phenomenon of sensitization between the ions involved and consequently enhance the luminescence efficiency generated by the metal elements (or rare-earth element) from the respective combinations. In each of these combinations, both component elements possess luminescence levels, respectively, and the difference of their levels is invariably small. In the case of the doped salt of the present invention, although the metal elements $M^{3+}$ and $M^{2+}$, themselves excepting gadolinium possess no luminescent levels, the doped salt formed of such metal element in conjunction with the rare-earth element L exhibits the specific synergistic effect described above. This is truly a surprising fact.

The second prerequisite for the novel organic rare-earth salt phosphor of the present invention is that the rare-earth metal salt of an organic carboxylic acid represented by the aforementioned general formula should be a crystalline salt. The inventors, in the course of their study, took notice of the fact that some of such salts of organic carboxylic acids exhibit a specific behavior. A further study on this specific behavior has led to a discovery that the presence and absence of the behavior depends on the presence and absence of crystalline structure. In other words, even the organic rare-earth salt synthesized from the same starting materials fails to show the luminescent characteristics of this invention when it has amorphous structure.

Although the theoretical detail underlying the manifestation of such luminescence characteristics remains yet to be elucidated, the fact that the presence or absence of the luminescent property depends on such difference in the structure of the salt is literally a startling discovery. It is also quite interesting to note that this peculiar phenomenon is observed only when the salt and the doped salt of the aforementioned specific organic carboxylic acid radical possess the crystalline structure. The effect of this invention can not be attained unless not merely the salt possesses the crystalline structure but also the organic carboxylic acid radical contains an organic group possessing at least three conjugate groups capable of conjugating with carboxyl group.

The novel organic rare-earth salt phosphor of the present invention is a salt which satisfies the relationship that the luminescent level $E_L$ of the rare-earth element L of this invention is substantially equal to or below the donor state $E_D$ of the crystalline salt.

The novel phosphor of the present invention, where $x=1$ is satisfied, can easily be produced by subjecting the aforementioned salt of organic carboxylic acid (such as, for example, an alkali metal salt or ammonium salt) and a salt of rare-earth element L (such as, for example, a water-soluble or alcohol-soluble salt) to an ion-exchange reaction. The doped salt which satisfies $0.04 \leq x < 1$ in the aforementioned general formula can easily be produced, similarly to the case of $x=1$ (Z=L), by subjecting the salt of carboxylic acid and the salt of rare-earth element L and the salt of a metal element ($M^{3+}$ and/or $M^{2+}$) simultaneously to an ion-exchange reaction. The crystalline structure can be imparted to the organic rare-earth salt phosphor in the course of the ion-exchange reaction by adjusting the reaction conditions. Otherwise, the reaction product which occurs in an amorphous state can be converted by an after-treatment into a crystalline state.

The various methods available for this purpose will be briefly described with respect to the salt satisfying $x=1$ (Z=L).

(1) A crystalline rare-earth metal salt of an organic carboxylic acid can be obtained by subjecting the aforementioned alkali metal salt or ammonium salt of the organic carboxylic acid and the soluble salt of a rare-earth element L to an ion-exchange reaction. In this reaction, the pH value of the reaction system must be adjusted within the range of from 2 to 10. This method permits the phosphor, namely, the novel crystalline rare-earth metal salt of organic carboxylic acid, to be produced very easily in high yields compared with other methods when the pH value of the reaction system is adjusted preferably within the range of from 3 to 8, most preferably within the range of from 3.5 to 7.5. Thus, this method has a high commercial significance.

(2) A crystalline rare-earth metal salt of an organic carboxylic acid can be obtained very easily and in high yields by allowing an amorphous rare-earth metal salt of the organic carboxylic acid which has been obtained by the aforementioned ion-exchange reaction between the aforementioned alkali metal salt or ammonium salt of the organic carboxylic acid and the soluble salt of rare-earth element L to be dried and thereafter left to stand or stirred within a solution of a pH value within the range of from 1.5 to 8, preferably from 2 to 7, most preferably from 2.5 to 6.5.

(3) A crystalline rare-earth metal salt of an organic carboxylic acid can be obtained by allowing the amorphous rare-earth metal salt of the organic carboxylic acid obtained as described in (2) above to be left to stand at room temperature for a prolonged period or to be subjected to a thermal treatment.

(4) A crystalline rare-earth metal salt of an organic carboxylic acid can be produced by causing the amorphous rare-earth metal salt of the organic carboxylic acid obtained as described in (2) above to be exposed to ultraviolet rays.

(5) A crystalline rare-earth metal salt of an organic carboxylic acid can be obtained in high yields by allowing the amorphous rare-earth metal salt of the organic carboxylic acid obtained as described in (2) above to be dissolved in a solvent and recrystallized from the solvent by an ordinary method, with the recrystallization repeated.

In any of the methods cited above, the crystalline rare-earth metal salt of the organic carboxylic acid can be obtained more efficiently when the reaction involved is gradually performed at suitably elevated temperatures.

The production of the salt can be advantageously carried out by adjusting the pH value of the reaction system with a buffer solution [such as, for example, (ammonium chloride)-(ammonia) solution].

It is also possible to produce a crystalline rare-earth metal salt of an organic carboxylic acid by allowing an oxide of the rare-earth element L to react directly upon the organic carboxylic acid under application of heat.

Alternatively, the production of a crystalline rare-earth metal salt of an organic carboxylic acid can be accomplished by causing saponification between the ester of the organic carboxylic acid and a hydroxide of the rare-earth element L under suitable conditions.

The crystalline rare-earth metal salts of organic carboxylic acids and the doped salts which are obtained as described above exhibit high luminescence efficiency enough to suit practical applications. The luminescence efficiency possessed by these salts and doped salts are invariably very high, no matter whether they possess water of crystallization. Compared with the conventional chelate compounds, they enjoy enhanced thermal, chemical and physical stability. They are epochal phosphors in respect that they are immensely improved in the weatherability, the lack of which has formed the fatal drawback for the chelate compounds.

The novel phosphors of the present invention also possess certain kinds of functional properties which have heretofore materialized their utility in practical applications such as, for example, very high luminescence efficiency high degrees of affinity for other chemical substances and potentialities and advantages of extensive applications to the fields of high-performance phosphors. Further from the commercial point of view, the present invention is quite significant and advantageous owing to the simplicity and ease of production and the bright prospect of mass production.

The crystalline rare-earth metal salts of organic carboxylic acids and the doped salts obtained by the present invention exhibit narrow and sharp line luminescence which are peculiar to rare-earth elements. For example, they efficiently emit light in peculiar colors such as red and green. Thus, they promise extensive utility in fields of highly advanced color harmonizing technologies demanding chromaticity of unusually high purity, typified by color television field, and in other fields. Moreover, since they can incorporate neodymium, a substance useful as a laser material, they are very hopeful as a basic material in the field of opto-electronics.

The novel phosphor of the present invention can emit upon exposure to a varying form of excitation source. For example, the exposure to the electron bombardment induces the cathodeluminescence. The electron beam is the same excitation source as used in the color television system, for example. The exposure to X-rays or γ-rays causes the phosphor to generate the radioluminescence. An example of the use of this excitation source is found in the intensifying phosphor for X-ray film. And photoluminescence by exposure to the light such as ultraviolet rays which serve as the excitation source for illuminating lamps such as fluorescent lamp is another example.

The novel substance according to the present invention is also hopeful as phosphor materials, illuminating materials, photosensitive materials, display materials, sensitizing materials, photographic materials, holographic display materials, high-resolving materials and functional materials applicable to paper and fiber products. It is also usable as a luminescent substance in a solid form or liquid form.

Polymers (plastics) incorporating at least one phosphor obtained by the present invention give birth to luminescent compositions of high transparency, luminescent compositions molded to desired sizes and shapes, luminescent compositions possessing flexibility, paint-like luminescent compositions dissolved in solvents, coat-like luminescent compositions coated with paint-like luminescent compositions, luminescent compositions mixed with pigments, pains, etc., luminescent compositions coated with said luminescent compositions and luminescent papers and fibers coated or impregnated with said luminescent compositions. The luminescent compositions obtained by coating such as paper, glass and plastic materials with the phosphorus of this invention with a suitable plastic binder efficiently emit lighting colors such as red and green which are peculiar to rare-earth elements.

Now, the present invention will be described below with reference to examples, which are not limitative of the invention.

The luminescence efficiency indicated in the examples of this invention was determined as described below.

Samples of the rare-earth metal salts or doped salts of an organic carboxylic acid used in given examples were sifted to separate a portion of particles 400 to 500 mesh.

The powder of the aforementioned organic rare-earth salt phosphor as described above was homogeneously and uniformly spread in a thickness of 30 to 40μ on a non-fluorescent quartz plate (3 cm×5 cm) having a thickness of 3 mm and the layer of the spread powder was set in position by being covered with another non-fluorescent quartz plate (3 cm×5 cm) having a thickness of 3 mm. The optimum excitation wavelength for the sample was directed to the surface of the non-fluorescent quartz plate, and the luminescence efficiency of the sample was determined based on the definition given below. (Measurement of the luminescence efficiency)

In this invention, the luminescence efficiency is indicated by the ratio of the number of photons emitted by the given phosphor to the number of photons absorbed by the same phosphor. Generally, this ratio assumes a value within the range of from 0% to 100%. This value increases in direct proportion to the degree of performance as a phosphor. The expression "luminescence efficiency" as used in the present invention is meant to refer to the relative quantum yield of the given sample against the standard sample of which absolute quantum yield is known, as reported in A. Bril and W. Hoekstra, Philips Research Reports 16, 356 (1961) and A. Bril and W. van Meurs-Hoekstra, Philips Research Reports 19, 296 (1964). It is defined as follows:

Luminescence efficiency (%) = Relative quantum yield = (1)

$$\left(\frac{F_x}{F_{st}}\right) \cdot Q_{st} \times \frac{1 - r_{st}}{1 - r_x}$$

wherein,
F: the integral area of corrected emission spectrum
Q: absolute quantum yield
st: standard sample
x: unknown test sample
r: reflectance The standard samples used for given tests were selected from those shown in Table 1 below to suit the particular purposes of the tests.

TABLE 1

| Standard sample | Color of luminescence | Excitation wavelength 250 to 270 nm | |
|---|---|---|---|
| | | Quantum yield | Reflectance |
| NBS1026,CaWO$_4$;Pb | Blue | 75(%) | 5(%) |
| NBS1028,Zn$_2$SiO$_4$;Mn | Green | 68 | 6 |
| NBS1029,CaSiO$_3$;Pb,Mn | Red | 68 | 11 |

The samples used for the measurement were invariably in a powdered form having a particle diameter within the range of from 400 to 500 mesh. In the measurement of the luminescence efficiency performed in the present invention, the reabsorption of luminescence by the samples was regarded as negligible with respect to the test samples as well as the standard samples.

The values of quantum yields and reflectances of the standard samples which are indicated in Table 2 were used. As to the excitation wavelength, the wavelength of 254 nm was used for the standard samples and the varying maximum wavelengths were selected for the test samples.

The measurement was carried out with an auto-corrected recording absolute spectrofluorophotometer (Model RF-502, Shimazu) using a xenone lamp as the light source.

During the measurement, the measuring section of the instrument was kept under the atmosphere of nitrogen gas or argon gas at a temperature of 25° C. The slit width and all the other test conditions were the same for both the standard samples and the test samples.

The reflectances of the test samples were determined with the Perkin Elmer 13U double-beam auto-recording spectrofluorophotometer provided with a diffuse reflection attachment. With magnesium oxide as the standard sample, the reflectances of the test samples were measured by the double beam method and applied to the formula (1).

EXAMPLE 1

By the different methods, (A) through (D), indicated below, crystalline europium cinnamate was prepared.

(A) In 300 ml of purified water, 1.64 g of sodium hydroxide was dissolved. In the resultant aqueous solution, 6.06 g of cinnamic acid (purity 99.9%, conjugate number 4) was thoroughly dissolved under stirring, to produce a sodium cinnamate aqueous solution. The pH value of this aqueous solution was adjusted to 11.0 with a 0.1 N sodium hydroxide aqueous solution. Then, a europium chloride aqueous solution obtained in advance by thoroughly dissolving 5.0 g of europium chloride (EuCl$_3$.6H$_2$O; purity 99.99%) in 100 ml of purified water was gradually added with stirring into the aforementioned sodium cinnamate aqueous solution at room temperature. Consequently, a white salt of europium cinnamate, [(C$_6$H$_5$CH=CHCOO)$_3$Eu], was obtained in the form of a precipitate. Subsequently, the reaction solution was adjusted to pH 5.0 with 0.1 N hydrochloric acid and then thoroughly stirred. The europium cinnamate thus produced was separated by means of a glass filter, thoroughly washed with 500 ml of purified water and dried in vacuo at 80° to 100° C. for 20 to 24 hours.

The europium cinnamate consequently obtained possessed the maximum excitation wavelength at about 335 nm, showed the red luminescence peculiar to europium at the principal emission wavelength of about 615 nm and had 82% of luminescence efficiency.

When the europium cinnamate was tested for infrared spectrum with an infrared spectrophotometer, Model 295, Hitachi, it showed the following peaks.

3060 cm$^{-1}$(w), 2930 cm$^{-1}$(w), 1640 cm$^{-1}$(s), 1580 cm$^{-1}$(w) 1500 cm$^{-1}$(vs), 1450 cm$^{-1}$(s), 1400 cm$^{-1}$(vs), 1330 cm$^{-1}$(w) 1295 cm$^{-1}$(m), 1244 cm$^{-1}$(s), 1205 cm$^{-1}$(w), 1080 cm$^{-1}$(w) 985 cm$^{-1}$(s), 930 cm$^{-1}$(w), 880 cm$^{-1}$(m), 855 cm$^{-1}$(w) 780 cm$^{-1}$(s), 740 cm$^{-1}$(s), 730 cm$^{-1}$(m)

(Note) w=weak, m=middle, s=strong, vs=very strong, sh=shoulder

When the europium cinnamate was tested for X-ray powder diffraction with an X-ray diffractometer, Rotaflex of Rigaku Denki, it showed crystalline diffraction pattern. The principal d-spacing is shown in Table 4.

When the europium cinnamate was tested for DSC with a DSC tester, Model 2 of Perkin-Elmer, it showed endothermic peaks at 556.5° K. and 577° K.

(B) In 100 ml of purified water, 5 g of europium chloride (EuCl$_3$.6H$_2$O; purity 99.99%) was thoroughly dissolved. By adjusting the pH value of the resultant aqueous solution to 1.2 with an aqueous 0.1 N hydrochloric acid, there was produced a europium chloride aqueous solution.

Then a sodium cinnamate aqueous solution obtained in advance by dissolving 1.64 g of sodium hydroxide in 300 ml of purified water and thereafter dissolving 6.06 g of cinnamic acid (purity 99.9%, conjugate number 4) thoroughly in the resultant solution was gradually added with continued stirring into the aforementioned aqueous europium chloride solution. Consequently, a white salt of europium cinnamate was produced in the form of a precipitate. Thereafter, the reaction solution was adjusted to pH 6.5 with a 0.1 N sodium hydroxide aqueous solution added under thorough stirring.

The europium cinnamate thus produced was separated by filtration, washed thoroughly with 500 ml of purified water and thereafter dried to vacuo at 80° to 100° C. for 20 to 24 hours.

The europium cinnamate thus obtained, when tested for IR spectrum, X-ray powder diffraction and DSC endothermic peaks, gave entirely the same results as the europium cinnamate obtained by the method (A).

Also it strongly showed the red luminescence peculiar to europium and it was found to possess the same maximum excitation wavelength and luminescence efficiency as the europium cinnamate obtained by the method (A).

(C) A sodium cinnamate aqueous solution was obtained by dissolving 1.64 g of sodium hydroxide in 300 ml of purified water and then adding to the resultant aqueous solution 6.06 g of cinnamic acid (purity 99.9%, conjugate number 4) while under stirring. This aqueous solution was adjusted to pH 11.0 with a 0.1 N sodium hydroxide aqueous solution. Then, a europium chloride aqueous solution obtained in advance by thoroughly dissolving 5.0 g of europium chloride ($EuCl_3.6H_2O$; purity 99.99%) in 100 ml of purified water was gradually added, while under stirring, into the aforementioned sodium cinnamate aqueous solution at room temperature, and consequently a white reaction product was precipitated. At this point, the reaction solution had a pH value of 10.2. Subsequently, the precipitated product was separated by filtration, thoroughly washed with 500 ml of purified water, and dried in vacuo at 80° to 100° C. for 20 to 24 hours.

The product thus obtained was left to stand in a constant temperature chamber at 20° to 35° C. for 150 to 180 days. The crystalline europium cinnamate consequently formed, when tested for infrared spectrum, X-ray powder diffraction and DSC endothermic peaks, gave entirely the same results as the crystalline europium cinnamate produced by the method (A). It showed the red luminescence peculiar to europium strongly and showed the same maximum excitation wavelength and luminescence efficiency as the europium cinnamate obtained by the method (A).

(D) The precipitated product obtained by the method (C) was dried in vacuo at 80° to 100° C. for 20 to 24 hours, then added into 500 ml of purified water and, while under stirring, adjusted to pH 5 with a 0.1 N hydrochloric acid, then subjected to continued stirring for two to three hours, separated by filtration and thoroughly washed with 800 ml of purified water. The europium cinnamate obtained by the crystallization procedure described above, when tested for infrared spectrum, X-ray powder diffraction and DSC endothermic peaks, gave entirely the same results as the crystalline europium cinnamate obtained by the method (A). It strongly showed the red luminescence peculiar to europium and showed the same maximum excitation wavelength and luminescence efficiency as the europium cinnamate obtained by the method (A).

EXAMPLES 2-5 AND COMPARATIVE EXAMPLES 1-2

In 300 ml of purified water, 1.64 g of sodium hydroxide was dissolved. In the resultant aqueous solution, 6.06 g of cinnamic acid (purity 99.9%, conjugate number 4) was throughly dissolved while under stirring, to produce a sodium cinnamate aqueous solution. To this aqueous solution, a europium chloride aqueous solution obtained in advance by thoroughly dissolving 5.0 g of europium chloride ($EuCl_3.6H_2O$; purity 99.99%) in 100 ml of purified water was gradually added at room temperature while under stirring. During the reaction, the pH value of the reaction solution was adjusted to a varying value indicated in Table 2. Then, it was subjected to continued thorough stirring and thereafter subjected to filtration. Then, the separated reaction product was thoroughly washed with 500 ml of purified water and dried in vacuo at 80° to 100° C. for 20 to 24 hours. Consequently, the products indicated in Table 2 were obtained.

The products obtained immediately after the vacuum drying were measured for luminescence efficiency. The results are shown in Table 2.

TABLE 2

|  | pH | Luminescence efficiency (%) |
|---|---|---|
| Comparative Example 1 | 1.5 | 0[1] |
| Example 2 | 2.8 | 8.5 |
| Example 3 | 4.5 | 82 |
| Example 4 | 7.0 | 82 |
| Example 5 | 9.0 | 7.0 |
| Comparative Example 2 | 10.2 | 0.05 |

Note
[1]No europium cinnamate was formed.

EXAMPLE 6 AND COMPARATIVE EXAMPLE 3

The products of europium cinnamate obtained in Example 4 and Comparative Example 2 were tested for X-ray powder diffraction and DSC by following the procedure of Example 1-(A). The results were as shown in Table 3.

TABLE 3

|  | Europium cinnamate used | d-spacing d(Å) | d-spacing $I/I_o$ | DSC (°K.) |
|---|---|---|---|---|
| Example 6 | Example 4 | 11.407 | 100 | 556.5, 577 |
|  |  | 6.600 | 45 | (Both of endo- |
|  |  | 5.691 | 40 | thermic peak) |
|  |  | 4.495 | 17 |  |
|  |  | 4.305 | 30 |  |
|  |  | 3.151 | 12 |  |
|  |  | 2.622 | 12 |  |
|  |  | 2.144 | 10 |  |
|  |  | 2.038 | 15 |  |
| Comparative Example 3 | Comparative Example 2 | No diffraction peak appeared between d = 1.542 to d = 17.673 (Å) (amorphous structure) | | No peak appeared up to 723° K. |

EXAMPLE 7

A sodium cinnamate aqueous solution was obtained by dissolving 1.638 g of sodium hydroxide in 300 ml of purified water and then thoroughly dissolving 6.065 g of cinnamic acid (conjugate number=4), while under stirring, in the resultant aqueous solution. This aqueous solution was adjusted to pH 11.0 with a 0.1 N sodium hydroxide aqueous solution. Then a europium chloride-lanthanum chloride mixed aqueous solution obtained by thoroughly dissolving 2.0 g of europium chloride ($EuCl_3.6H_2O$; purity 99.9%) and 2.893 g of lanthanum chloride ($LaCl_3.6H_2O$; purity 99.9%) in 100 ml of purified water was added under stirring to the aforementioned sodium cinnamate aqueous solution at room temperature. Consequently, a white doped salt was obtained in the form of a precipitate. The reaction solution was adjusted to pH 5.0 with 0.1 N hydrochloric acid and then stirred thoroughly. The doped salt of cinnamic acid, $[(C_6H_5CH=CHCOO)_3(Eu_{0.4}La_{0.6})]$, was separated by means of a glass filter, washed thoroughly with 500 ml of purified water and thereafter dried in vacuo at 80° to 100° C. for 20 to 24 hours.

The doped salt thus obtained strongly showed the red luminescence peculiar to europium at the main luminescent wavelength of about 615 nm and had 86% of luminescence efficiency.

When the doped salt was tested for X-ray powder diffraction, it showed crystalline diffraction pattern. The d-spacing was as shown in Table 4.

COMPARATIVE EXAMPLE 4

A sodium cinnamate aqueous solution was obtained by dissolving 1.698 g of sodium hydroxide in 300 ml of purified water and then thoroughly dissolving 6.289 g of cinnamic acid (conjugate number=4), while under stirring, in the resultant aqueous solution. This aqueous solution was adjusted to pH 11.0 with a 0.1 N. sodium hydroxide aqueous solution. Then, a lanthanum chloride aqueous solution obtained by thoroughly dissolving 5.0 g of lanthanum chloride ($LaCl_3.6H_2O$; purity 99.9%) in 100 ml of purified water was added, while under stirring into the aforementioned sodium cinnamate aqueous solution at room temperature. Consequently, a white lanthanum cinnamate, $[(C_6H_5CH=CHCOO)_3La]$, was obtained in the form of a precipitate. The reaction solution was adjusted to pH 5.0 with 0.1 N hydrochloric acid and thoroughly stirred. The lanthanum cinnamate thus obtained was separated by means of a glass filter, washed thoroughly with 500 ml of purified water and thereafter dried in vacuo at 80° to 100° C. for 20 to 24 hours.

When the lanthanum cinnamate obtained as described above was exposed to a light of 240 nm to 400 nm, absolutely no luminescence was observed.

When this salt was tested for X-ray powder diffraction, it showed crystalline diffraction pattern. The d-spacing was as shown in Table 4.

COMPARATIVE EXAMPLE 5

Europium cinnamate, $[(C_6H_5CH=CHCOO)_3Eu]$, was obtained by following the procedure of Comparative Example 4, except that the quantity of sodium hydroxide was changed from 1.698 g to 1.132 g, the quantity of cinnamic acid was changed from 6.289 g to 4.193 g and 5.0 g of lanthanum chloride was substituted by 3.456 g of europium chloride ($EuCl_3.6H_2O$; purity 99.9%). Then, the total quantity of lanthanum cinnamate obtained as described in Comparative Example 4 and the total quantity of europium cinnamate described above were placed in an agate mortar and thoroughly mixed until a homogeneous mixture was obtained. Consequently, there was obtained a physical mixture of 0.6 lanthanum cinnamate and 0.4 europium cinnamate;

$[0.6(C_6H_5CH=CHCOO)_3La - 0.4(C_6H_5CH=CHCOO)_3Eu]$.

This mixture showed the red luminescence peculiar to europium at about 615 nm and showed 30% of luminescence efficiency.

When the mixture was tested for X-ray powder diffraction, it showed crystalline diffraction pattern due to the component salts. The d-spacing was as shown in Table 4.

TABLE 4

| Lanthanum cinnamate | | Doped salt | | Mixed salt | | Europium cinnamate | |
|---|---|---|---|---|---|---|---|
| d(Å) | I/I$_o$ | d(Å) | I/I$_o$ | d(Å) | I/I$_o$ | d(Å) | I/I$_o$ |
| 11.481 | (100) | 11.436 | (100) | 11.407 | (100) | 11.407 | (100) |
| 6.583 | (37) | 6.578 | (48) | 6.583 | (36) | 6.598 | (40) |
| 5.698 | (31) | 5.695 | (41) | 5.691 | (31) | 5.691 | (35) |
| 4.529 | (12) | | | 4.520 | (13) | | |
| | | 4.495 | (17) | | | 4.495 | (15) |
| | | | | 4.488 | (9) | | |
| 4.301 | (25) | 4.297 | (33) | 4.299 | (26) | 4.305 | (30) |
| 3.939 | (7) | | | 3.934 | (4) | | |
| | | 3.917 | (10) | | | | |
| | | | | 3.903 | (6) | 3.897 | (7) |
| 3.795 | (4) | 3.786 | (6) | 3.786 | (5) | 3.784 | (5) |
| 3.712 | (4) | | | 3.708 | (2) | | |
| | | 3.648 | (3) | | | | |
| | | | | 3.610 | (4) | 3.609 | (4) |
| 3.284 | (6) | 3.278 | (6) | 3.278 | (2) | 3.278 | (5) |
| 3.153 | (9) | 3.148 | (10) | 3.153 | (8) | 3.151 | (10) |

EXAMPLE 8

A doped salt of cinnamic acid, $[(C_6H_5CH=CHCOO)_3(Eu_{0.5}Y_{0.5})]$, was obtained by following the procedure of Example 1, except that the quantity of europium chloride was changed from 2.0 g to 2.5 g and 2.893 g of lanthanum chloride was substituted by 2.07 g of yttrium chloride ($YCl_3.6H_2O$: purity 99.9%).

The doped salt thus obtained showed the red luminescence peculiar to europium at about 616 nm and showed 93% of luminescence efficiency.

When this doped salt was tested for X-ray powder diffraction, it showed crystalline diffraction pattern. The d-spacing was as shown below.

| d (Å) | I/I$_o$ | d (Å) | I/I$_o$ |
|---|---|---|---|
| 11.481 | 100 | 3.909 | 10 |
| 6.607 | 40 | 3.798 | 3 |
| 5.717 | 29 | 3.610 | 7 |
| 4.479 | 21 | 3.282 | 3 |
| 4.309 | 21 | 3.156 | 7 |

COMPARATIVE EXAMPLE 6

Yttrium cinnamate, [(C$_6$H$_5$CH=CHCOO)$_3$Y], was obtained by following the procedure of Comparative Example 4, except that 5.0 g of lanthanum chloride was substituted by 4.292 g of yttrium chloride (YCl$_3$.6H$_2$O; purity 99.9%).

When the yttrium cinnamate thus obtained was exposed to a light of 240 nm to 400 nm, the luminescence due to yttrium was not observed at all.

When this salt was tested for X-ray powder diffraction, it showed crystalline diffraction pattern. The d-spacing was as shown below.

| d (Å) | I/I$_o$ | d (Å) | I/I$_o$ |
|---|---|---|---|
| 13.060 | 100 | 4.461 | 41 |
| 11.586 | 77 | 4.336 | 4 |
| 9.007 | 37 | 3.958 | 36 |
| 8.393 | 40 | 3.888 | 11 |
| 6.530 | 80 | 3.782 | 8 |
| 5.776 | 17 | 3.677 | 17 |
| 5.512 | 18 | 3.278 | 10 |
| 5.152 | 12 | 3.132 | 10 |
| 4.671 | 21 | | |

COMPARATIVE EXAMPLE 7

Europium cinnamate, [(C$_6$H$_5$CH=CHCOO)$_3$Eu], was obtained by following the procedure of Comparative Example 4, except that 5.0 g of lanthanum chloride was substituted by 5.185 g of europium chloride (EUCl$_3$.6H$_2$O; purity 99.9%). Then, the total quantity of yttrium cinnamate, [(C$_6$H$_5$CH=CHCOO)$_3$Y], obtained as described in Comparative Example 6 and the total quantity of europium cinnamate described above were placed in an agate mortar and thoroughly mixed until there was produced a homogeneous mixture. Consequently, there was obtained a physical mixture of 0.5 europium cinnamate and 0.5 ytrrium cinnamate; [0.5(C$_6$H$_5$CH=CHCOO)$_3$Eu−0.5(C$_6$H$_5$CH=CHCOO)$_3$Y].

The mixture thus obtained showed the red luminescence peculiar to europium at about 615 nm and showed 38% of luminescence efficiency.

When this mixture was tested for X-ray powder diffraction, it showed crystalline diffraction pattern due to the component salts. The d-spacing was as shown below.

| d (Å) | I/I$_o$ | d (Å) | (I/I$_o$) |
|---|---|---|---|
| 13.192 | 12 | 4.466 | 28 |
| 11.436 | 100 | 4.291 | 24 |
| 9.007 | 5 | 3.986 | 4 |
| 8.409 | 5 | 3.900 | 13 |
| 6.568 | 27 | 3.787 | 5 |
| 5.687 | 33 | 3.610 | 12 |
| 5.512 | 4 | 3.278 | 7 |
| 5.155 | 2 | 3.150 | 12 |
| 4.671 | 4 | | |

EXAMPLES 9–17 and COMPARATIVE EXAMPLE 8

TABLE 5

| Example No. | Run No. | Europium chloride | Gadolinium chloride |
|---|---|---|---|
| 9 | 1 | 4.25 g | 0.761 g |
| 10 | 2 | 3.5 g | 1.522 g |
| 11 | 3 | 3.0 g | 2.029 g |
| 12 | 4 | 2.5 g | 2.536 g |
| 13 | 5 | 2.0 g | 3.043 g |
| 14 | 6 | 1.5 g | 3.551 g |
| 15 | 7 | 1.0 g | 4.058 g |
| 16 | 8 | 0.5 g | 4.565 g |
| 17 | 9 | 0.3 g | 4.768 g |
| Comparative Example 8 | 10 | 0.15 g | 4.920 g |

Figure 2:
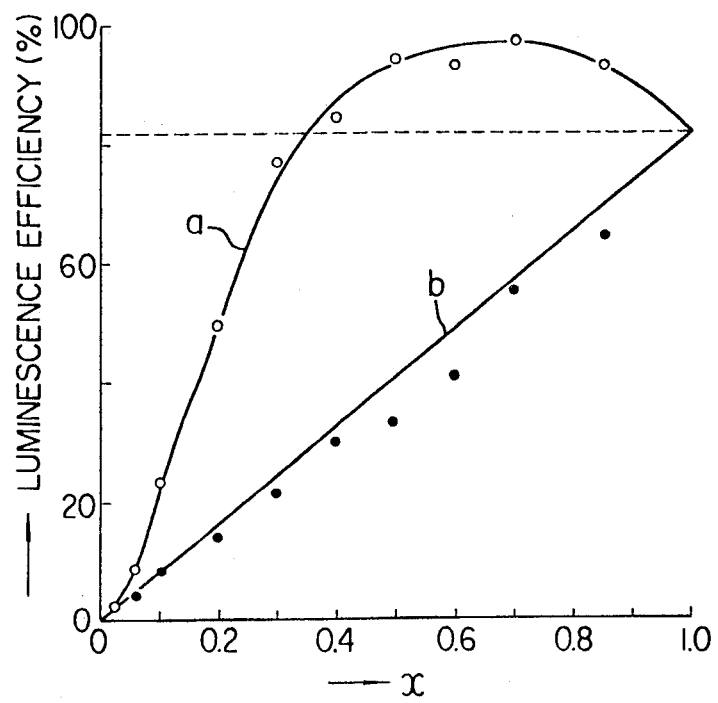
FIG. 2 is a graph showing the results of the measurement of the luminescence efficiency conducted on the doped salts, $(C_6H_5CH=CHCOO)_3(Eu_x Gd_y)$ (wherein x+y=1), indicated in Examples 3–11 (the curve a in the graph), compared with the results similarly obtained of the mixed systems, $x(C_6H_5CH=CHCOO)_3Eu-y(C_6H_5CH=CHCOO)_3Gd$ (wherein x+y=1), indicated in Comparative Examples 6–16 (the curve b in the graph), with "x" respectively as the variable. In the graph, the dotted line represents the values of luminescence efficiency obtained of $(C_6H_5CH=CHCOO)_3Eu$.

The varying quantities of europium chloride and gadolinium chloride (both in the form of hexahydrate and of purity of 99.9%) indicated in Run Nos. 1–10 were thoroughly dissolved each in 100 ml of purified water to produce mixed aqueous solutions indicated correspondingly in Run Nos. 1–10 respectively. The varying mixed aqueous solutions, No. 1 through No. 10, mentioned above were each caused by the procedure of Example 7 to react with a sodium cinnamate aqueous solution obtained by dissolving 1.638 g of sodium hydroxide in 300 ml of purified water and subsequently treating the resultant aqueous solution with 6.065 g of cinnamic acid (conjugate number=4) by faithfully following the procedure of Example 7. Consequently, there were obtained doped salts indicated in Table 6. The doped salts invariably showed the red luminescence at the main emission wavelength of about 615 nm. The luminescence efficiencies found for the doped salts are also shown in Table 6. The relation with the composition X is indicated by the curve a in the graph of FIG. 2. When the doped salts were tested for X-ray powder diffraction, they showed crystalline diffraction pattern.

TABLE 6

| Example | Doped salt | Luminescence efficiency |
|---|---|---|
| 9 | (C$_6$H$_5$CH=CHCOO)$_3$(Eu$_{0.85}$Gd$_{0.15}$) | 93.2% |
| 10 | (C$_6$H$_5$CH=CHCOO)$_3$(Eu$_{0.70}$Gd$_{0.30}$) | 97.6% |
| 11 | (C$_6$H$_5$CH=CHCOO)$_3$(Eu$_{0.60}$Gd$_{0.40}$) | 93.2% |
| 12 | (C$_6$H$_5$CH=CHCOO)$_3$(Eu$_{0.50}$Gd$_{0.50}$) | 94.0% |
| 13 | (C$_6$H$_5$CH=CHCOO)$_3$(Eu$_{0.40}$Gd$_{0.60}$) | 84.5% |
| 14 | (C$_6$H$_5$CH=CHCOO)$_3$(Eu$_{0.30}$Gd$_{0.70}$) | 76.8% |
| 15 | (C$_6$H$_5$CH=CHCOO)$_3$(Eu$_{0.20}$Gd$_{0.80}$) | 49.5% |
| 16 | (C$_6$H$_5$CH=CHCOO)$_3$(Eu$_{0.10}$Gd$_{0.90}$) | 23.0% |
| 17 | (C$_6$H$_5$CH=CHCOO)$_3$(Eu$_{0.06}$Gd$_{0.94}$) | 8.2% |
| Comparative Example 8 | (C$_6$H$_5$CH=CHCOO)$_3$(Eu$_{0.03}$Gd$_{0.97}$) | 2.5% |

COMPARATIVE EXAMPLES 9-18

TABLE 7

| Comparative Example No. | Run No. | With europium chloride Cinnamic acid | NaOH | With gadolinium chloride Cinnamic acid | NaOH |
|---|---|---|---|---|---|
| 9 | 1 | 5.155 g | 1.392 g | 0.910 g | 0.246 g |
| 10 | 2 | 4.246 g | 1.146 g | 1.820 g | 0.491 g |
| 11 | 3 | 3.639 g | 0.983 g | 2.426 g | 0.655 g |
| 12 | 4 | 3.033 g | 0.819 g | 3.033 g | 0.819 g |
| 13 | 5 | 2.426 g | 0.655 g | 3.639 g | 0.983 g |
| 14 | 6 | 1.820 g | 0.491 g | 4.246 g | 1.146 g |
| 15 | 7 | 1.213 g | 0.328 g | 4.852 g | 1.310 g |
| 1.408 g | 8 | 0.60 | g | 0.164 g | 5.459 g |
| 17 | 9 | 0.364 g | 0.098 g | 5.701 g | 1.539 g |
| 18 | 10 | 0.182 g | 0.049 g | 5.883 g | 1.588 g |
| Example No. 1-(A) | | 6.065 g | 1.638 g | 0 g | 0 g |

Sodium cinnamate aqueous solutions were obtained by treating the varying quantities of cinnamic acid and sodium hydroxide indicated for Run Nos. 1-10 in Table 7 by following the procedure of Example 1. Then by following the procedure of Comparative Example 4, these sodium cinnamate aqueous solutions were treated respectively with europium chloride aqueous solutions and gadolinium chloride aqueous solutions prepared by thoroughly dissolving the varying quantities of these chlorides indicated for Run Nos. 1-10 in Table 5 in 50 ml of purified water. Consequently, there were obtained europium cinnamates $[(C_6H_5CH=CHCOO)_3Eu]$ and gadolinium cinnamates $[(C_6H_5CH=CHCOO)_3Gd]$ respectively. The ten sets of europium cinnamate and gadolinium cinnamate obtained as described above were each placed in an agate mortar and thoroughly mixed until a homogeneous mixture was obtained. Thus, there were obtained the physical mixtures indicated in Table 8. These mixed salts invariably showed the red luminescence at the main emission wavelength of about 615 nm. The luminescence efficiencies found for the mixtures are also shown in Table 8. The relationship with the composition x is shown by the curve b in the graph of FIG. 2. When the mixed salts were tested for X-ray powder diffraction, they showed crystalline diffraction pattern due to the component salts.

TABLE 8

| Comparative Example No. | Mixed Salt | Luminescence efficiency |
|---|---|---|
| 9 | $0.85(C_6H_5CH=CHCOO)_3Eu—0.15(C_6H_5CH=CHCOO)_3Gd$ | 64.3% |
| 10 | $0.70(C_6H_5CH=CHCOO)_3Eu—0.30(C_6H_5CH=CHCOO)_3Gd$ | 55% |
| 11 | $0.60(C_6H_5CH=CHCOO)_3Eu—0.40(C_6H_5CH=CHCOO)_3Gd$ | 40.5% |
| 12 | $0.50(C_6H_5CH=CHCOO)_3Eu—0.50(C_6H_5CH=CHCOO)_3Gd$ | 33% |
| 13 | $0.40(C_6H_5CH=CHCOO)_3Eu—0.60(C_6H_5CH=CHCOO)_3Gd$ | 29.5% |
| 14 | $0.30(C_6H_5CH=CHCOO)_3Eu—0.70(C_6H_5CH=CHCOO)_3Gd$ | 21.5% |
| 15 | $0.20(C_6H_5CH=CHCOO)_3Eu—0.80(C_6H_5CH=CHCOO)_3Gd$ | 14.2% |
| 16 | $0.10(C_6H_5CH=CHCOO)_3Eu—0.90(C_6H_5CH=CHCOO)_3Gd$ | 8% |
| 17 | $0.06(C_6H_5CH=CHCOO)_3Eu—0.94(C_6H_5CH=CHCOO)_3Gd$ | 4% |
| 18 | $0.03(C_6H_5CH=CHCOO)_3Eu—0.97(C_6H_5CH=CHCOO)_3Gd$ | 2% |
| Example No. 1-(A) | $(C_6H_5CH=CHCOO)_3Eu$ | 82% |

EXAMPLE 18

A sodium cinnamate aqueous solution was obtained by dissolving 1.638 g of sodium hydroxide in 300 ml of purified water and subsequently stirring 6.065 g of cinnamic acid (conjugate number=4) in the resultant solution until thorough dissolution. This aqueous solution was adjusted to pH 11.0 with a 0.1 N sodium hydroxide aqueous solution. Then, a mixed aqueous solution of europium chloride-lanthanum chloride-yttrium chloride obtained by thoroughly mixing 3.0 g of europium chloride ($EuCl_3.6H_2O$; purity 99.9%), 1.447 g of lanthanum chloride ($LaCl_3.6H_2O$; purity 99.9%) and 0.414 g of yttrium chloride ($YCl_3.6H_2O$; purity 99.9%) in 100 ml of purified water was gradually added, while under stirring, to the aforementioned sodium cinnamate aqueous solution at room temperature. Consequently, there was obtained a white doped salt in the form of a precipitate. The reaction solution was adjusted to pH 5.0 with 0.1 N hydrochloride acid and then stirred amply. The resultant doped salt of cinnamic acid, $$[(C_6H_5CH=CHCOO)_3(Eu_{0.6}La_{0.3}Y_{0.1})],$$

was separated by means of a glass filter, washed thoroughly with 500 ml of purified water and then dried in vacuo at 80° to 100° C. for 20 to 24 hours.

The doped salt thus obtained strongly showed the red luminescence peculiar to europium at the main emission wavelength of about 615 nm. The luminescent efficiency was 91%.

When the doped salt was tested for X-ray powder diffraction, it showed crystalline diffraction pattern.

EXAMPLE 19

A doped salt of cinnamic acid, $[(C_6H_5CH=CHCOO)_3(Eu_{0.7}Y_{0.3})]$, was obtained by following the procedure of Example 7, except that the quantity of europium chloride was changed from 2.0 g to 3.5 g and 2.893 g of lanthanum chloride was substituted by 1.242 g of yttrium chloride ($YCl_3.6H_2O$; purity 99.9%).

The resultant doped salt strongly showed the red luminescence peculiar to europium at the wavelength of about 615 nm. The luminescence efficiency was 92%. When the doped salt was tested for X-ray powder diffraction, it showed crystalline diffraction pattern.

EXAMPLES 20-23 and COMPARATIVE EXAMPLE 19

TABLE 9

| Example No. | Run No. | Europium chloride | Lanthanum chloride |
|---|---|---|---|
| 20 | 1 | 2.5 g | 2.411 g |
| 21 | 2 | 1.75 g | 3.134 g |
| 22 | 3 | 0.75 g | 4.099 g |
| 23 | 4 | 0.2 g | 4.629 g |
| Comparative Example 19 | 5 | 0.1 g | 4.726 g |

Mixed aqueous solutions, Run Nos. 1-5, indicated in Table 9 were obtained by thoroughly dissolving the varying quantities of europium chloride and lanthanum chloride (invariably hexahydrates; purity 99.9%) respectively indicated in the same table each in 100 ml of purified water. The mixed aqueous solutions, Nos. 1–5, indicated above were each reacted, by following the procedure of Example 7, with a sodium cinnamate aqueous solution obtained by dissolving 1.638 g of sodium hydroxide in 300 ml of purified water and subsequently treating the resultant aqueous solution with 6.065 g of cinnamic acid (conjugate number=4) by faithfully following the procedure of Example 7. Consequently, there were obtained doped salts indicated in Table 10. The doped salts invariably showed the red luminescence at the main emission wavelength of about 615 nm. The luminescence efficiencies found for the doped salts are also shown in Table 10. When they were tested for X-ray powder diffraction pattern, they showed crystalline diffraction pattern.

TABLE 10

| Example | Doped salt | Luminescence efficiency |
|---|---|---|
| 20 | $(C_6H_5CH=CHCOO)_3(Eu_{0.5}La_{0.5})$ | 91.5% |
| 21 | $(C_6H_5CH=CHCOO)_3(Eu_{0.35}La_{0.65})$ | 83.0% |
| 22 | $(C_6H_5CH=CHCOO)_3(Eu_{0.15}La_{0.85})$ | 32.3% |
| 23 | $(C_6H_5CH=CHCOO)_3(Eu_{0.04}La_{0.96})$ | 5.8% |
| Comparative Example 19 | $(C_6H_5CH=CHCOO)_3(Eu_{0.02}La_{0.98})$ | 1.5% |

EXAMPLE 24

A doped salt of p-toluic acid, $[(p-CH_3C_6H_5COO)_3(Eu_{0.4}La_{0.6})]$, was obtained by following the procedure of Example 7, except that 6.065 g of cinnamic acid was substituted by 5.573 g of p-toluic acid (conjugate number=3). The doped salt strongly showed the red luminescence peculiar to europium at the main emission wavelength of about 615 nm. The luminescence efficiency was 39%.

When the doped salt was tested for X-ray powder diffraction, it showed crystalline diffraction pattern.

EXAMPLE 25

Europium p-toluate, $[(p-CH_3C_6H_4COOH)_3Eu]$, was obtained by following the procedure of Example 1-(A), except that 6.06 g of cinnamic acid was substituted by 5.57 g of p-toluic acid (conjugate number=3; purity 99.9%).

The europium p-toluate thus obtained showed its maximum excitation wavelength at about 312 nm. It strongly showed the red luminescence peculiar to europium at the main emission wavelength of about 615 nm. The luminescence efficiency was 36%. It showed the following peaks in the infrared spectrum.

3040 cm$^{-1}$(w), 2930 cm$^{-1}$(w), 1610 cm$^{-1}$(m), 1590 cm$^{-1}$(m) 1520 cm$^{-1}$(s), 1410 cm$^{-1}$(vs), 1390 cm$^{-1}$(sh), 1295 cm$^{-1}$(w) 1180 cm$^{-1}$(m), 1140 cm$^{-1}$(m), 1020 cm$^{-1}$(w), 860 cm$^{-1}$(m) 790 cm$^{-1}$(m), 760 cm$^{-1}$(s)

When the europium p-toluate was tested for X-ray powder diffraction, it showed crystalline diffraction pattern. The d-spacing was as follows.

| d(Å) | $I/I_o$ |
|---|---|
| 11.946 | 95 |
| 11.632 | 100 |
| 6.758 | 16 |
| 5.945 | 18 |
| 5.791 | 30 |

-continued

| d(Å) | $I/I_o$ |
|---|---|
| 4.439 | 16 |

When the salt was tested for DSC, it showed an endothermic peak at 545° K.

EXAMPLE 26

A doped salt of m-toluic acid, $[(m-CH_3CH_6H_4COO)_3(Eu_{0.6}Y_{0.4})]$, was obtained by following the procedure of Example 7, except that 6.065 g of cinnamic acid was substituted by 5.573 g of m-toluic acid (conjugate number=3), the quantity of europium chloride was changed from 2.0 g to 3.0 g, and 2.893 g of lanthanum chloride was substituted by 1.656 g of yttrium chloride ($YCl_3 \cdot 6H_2O$; purity 99.9%). The resultant doped salt strongly showed the red luminescence peculiar to europium at the main emission wavelength of about 615 nm. The luminescence efficiency was 40.5%. When the doped salt was tested for X-ray powder diffraction, it showed crystalline diffraction pattern.

EXAMPLE 27

Europium m-toluate, $[(m-CH_3C_6H_4COO)_3Eu]$, was obtained by following the procedure of Example 25, except that p-toluic acid was substituted by m-toluic acid (conjugate number=3).

The resultant europium m-toluate strongly showed the red luminescence peculiar to europium at the main emission wavelength of about 615 nm. The luminescence efficiency was 35%. When the doped salt was tested for X-ray powder diffraction and DSC, it showed both crystalline diffraction pattern and endothermic peaks.

EXAMPLES 28–31 and COMPARATIVE EXAMPLE 20

TABLE 11

| Example No. | Run No. | Terbium chloride | Gadolinium chloride |
|---|---|---|---|
| 28 | 1 | 3.5 g | 1.493 g |
| 29 | 2 | 2.5 g | 2.489 g |
| 30 | 3 | 1.5 g | 3.484 g |
| 31 | 4 | 0.5 g | 4.480 g |
| Comparative Example 20 | 5 | 0.15 g | 4.828 g |

The doped salts indicated in Table 12 were obtained by following the procedure of Example 20, except that the varying quantities of europium chloride and lanthanum chloride indicated for Run Nos. 1–5 in Table 9 were changed to the varying quantities of terbium chloride and gadolinium chloride (invariably hexahydrates; purity 99.9%) indicated for Run Nos. 1–5 in Table 10, respectively, 6.065 g of cinnamic acid was substituted by 5.469 g of p-toluic acid and the quantity of sodium hydroxide was changed from 1.638 g of 1.607 g. The resultant doped salts invariably showed the green luminescence at the main emission wavelength of about 543 nm. The luminescence efficiencies are also shown in Table 12.

TABLE 12

| Example | Doped salt | Luminescence efficiency |
|---|---|---|
| 28 | $(p-CH_3C_6H_4COO)_3(Tb_{0.7}Gd_{0.3})$ | 58.2% |
| 29 | $(p-CH_3C_6H_4COO)_3(Tb_{0.5}Gd_{0.5})$ | 54.5% |
| 30 | $(p-CH_3C_6H_4COO)_3(Tb_{0.3}Gd_{0.7})$ | 41.2% |

TABLE 12-continued

| Example | Doped salt | Luminescence efficiency |
|---|---|---|
| 31 | (p-CH$_3$C$_6$H$_4$COO)$_3$(Tb$_{0.1}$Gd$_{0.9}$) | 13.9% |
| Comparative Example 20 | (p-CH$_3$C$_6$H$_4$COO)$_3$(Tb$_{0.03}$Gd$_{0.97}$) | 1.3% |

When the doped salts were tested for X-ray powder diffraction, they showed crystalline diffraction pattern.

Example 32

Terbium p-toluate was obtained by following the procedure of Example 1-(A), except that 6.065 g of cinnamic acid was substituted by 5.57 g of p-toluic acid (conjugate number=3; purity 99.9%) and europium chloride was substituted by 5.1 g of terbium chloride (TbCl$_3$.6H$_2$O; purity 99.99%).

The resultant terbium p-toluate [(p-CH$_3$C$_6$H$_4$COO)$_3$Tb] showed its maximum excitation wavelength at about 290 nm. It also showed strongly the green luminescence peculiar to terbium at the main emission wavelength of about 543 nm. The luminescence efficiency was 46%. The peaks of infrared spectrum were as shown below.

3040 cm$^{-1}$(w), 2930 cm$^{-1}$(w), 1610 cm$^{-1}$(m), 1590 cm$^{-1}$(m) 1520 cm$^{-1}$(s), 1410 cm$^{-1}$(vs), 1295 cm$^{-1}$(w), 1180 cm$^{-1}$(m) 1140 cm$^{-1}$(w), 1020 cm$^{-1}$(w), 860 cm$^{-1}$(m), 790 cm$^{-1}$(w) 760 cm$^{-1}$(s)

When the terbium p-toluate was tested for X-ray powder diffraction, it showed crystalline diffraction pattern. The d-spacing was as shown below.

| d(Å) | I/I$_o$ |
|---|---|
| 11.191 | 100 |
| 10.848 | 60 |
| 6.281 | 20 |
| 5.574 | 35 |
| 5.353 | 13 |
| 4.114 | 15 |

When the salt was tested for DSC, it showed endothermic peaks at 540° K. and 545° K.

COMPARATIVE EXAMPLES 21–24

TABLE 13

| Comparative Example No. | Run No. | With terbium chloride p-Toluic acid | NaOH | With gadolinium chloride p-Toluic acid | NaOH |
|---|---|---|---|---|---|
| 21 | 1 | 3.829 g | 1.125 g | 1.641 g | 0.482 g |
| 22 | 2 | 2.735 g | 0.803 g | 2.735 g | 0.803 g |
| 23 | 3 | 0.547 g | 0.161 g | 4.922 g | 1.446 g |
| 24 | 4 | 0.164 g | 0.048 g | 5.305 g | 1.559 g |

The varying quantities of p-toluic acid and sodium hydroxide indicated for Run Nos. 1–4 in Table 13 were treated by following the procedure of Example 7 to produce aqueous sodium p-toluate solutions, respectively. These aqueous solutions were respectively reacted by following the procedure of Comparative Example 4, with the aqueous terbium solutions and aqueous gadolinium solutions obtained by thoroughly dissolving the varying quantities of each chloride indicated for Run Nos. 1–4 in Table 14 each in 50 ml of purified water, to produce terbium p-toluate, [(p-CH$_3$C$_6$H$_4$COO)$_3$Tb], and gadolinium p-toluate, [(p-CH$_3$C$_6$H$_4$COO)$_3$Gd]. The four sets of terbium p-toluate and gadolinium p-toluate obtained as described above were each mixed by following the procedure of Comparative Example 5, to produce the physical mixtures shown in Table 15.

TABLE 14

| Comparative Example No. | Run No. | Terbium chloride | Gadolinium chloride |
|---|---|---|---|
| 21 | 1 | 3.5 g | 1.493 g |
| 22 | 2 | 2.5 g | 2.489 g |
| 23 | 3 | 0.5 g | 4.480 g |
| 24 | 4 | 0.15 g | 4.828 g |

The mixtures invariably showed the green luminescence at the main emission wavelength of about 543 nm. The luminescence efficiencies are also shown in Table 15. And, the luminescence efficiency found for terbium p-toluate, [(p-CH$_3$C$_6$H$_4$COO)$_3$Tb], was 46%.

TABLE 15

| Comparative Example | Mixture | Luminescence efficiency |
|---|---|---|
| 21 | 0.7(p-CH$_3$C$_6$H$_4$COO)$_3$Tb—0.3(p-CH$_3$C$_6$H$_4$COO)$_3$Gd | 30.0% |
| 22 | 0.5(p-CH$_3$C$_6$H$_4$COO)$_3$Tb—0.5(p-CH$_3$C$_6$H$_4$COO)$_3$Gd | 20.3% |
| 23 | 0.1(p-CH$_3$C$_6$H$_4$COO)$_3$Tb—0.9(p-CH$_3$C$_6$H$_4$COO)$_3$Gd | 4.2% |
| 24 | 0.03(p-CH$_3$C$_6$H$_4$COO)$_3$Tb—0.97(p-CH$_3$C$_6$H$_4$COO)$_3$Gd | 1.3% |

When the mixtures were tested for X-ray powder diffraction, they showed crystalline diffraction pattern due to the component salts.

COMPARATIVE EXAMPLE 25

Strontium p-toluate, [(p—CH$_3$C$_6$H$_4$COO)$_2$Sr], was obtained by following the procedure of Example 1-(A), except that 6.06 g of cinnamic acid was substituted by 3.06 g of p-toluic acid (conjugate number=3) and 5.0 g of europium chloride was substituted by 3.0 g of strontium chloride (SrCl$_2$.6H$_2$O). When the resultant strontium p-toluate was exposed to a light having a wavelengths of 240 nm–400 nm, it showed absolutely no discernible emission due to strontium. When the salt was tested for X-ray powder diffraction, it showed crystalline diffraction pattern.

EXAMPLE 33

Terbium m-toluate, [(m—CH$_3$C$_6$H$_4$COO)$_3$Tb], was obtained by following the procedure of Example 32, except that p-toluic acid was substituted by m-toluic acid (conjugate number=3).

The resultant terbium m-toluate strongly showed the green luminescence peculiar to terbium at the main emission wavelength of about 543 nm. The luminescence efficiency was 49%. When the salt was tested for X-ray powder diffraction and DSC, it showed crystalline diffraction pattern and endothermic peaks.

EXAMPLES 34–36

TABLE 16

| Example No. | Run No. | Compound | |
|---|---|---|---|
| 34 | 1 | Calcium chloride | 1.794 g |
| 35 | 2 | Strontium chloride | 2.183 g |
| 36 | 3 | Barium chloride | 2.000 g |

The various doped salts indicated in Table 17 were obtained by following the procedure of Example 7, except that 2.893 g of lanthanum chloride was substituted by the varying compounds indicated for Run Nos. 1–3 in Table 16, respectively, and the quantity of europium chloride was changed from 2.0 g to 3.0 g. The resultant doped salts invariably showed strongly the red luminescence peculiar to europium at the main emission wavelength of about 615 nm. The luminescence efficiencies found for the doped salts are also shown in Table 17. The compounds shown in Table 16 were hexahydrates except for barium chloride ($BaCl_2.2H_2O$).

When the doped salts were tested for X-ray powder diffraction, they showed crystalline diffraction pattern.

TABLE 17

| Example | Doped salt | Luminescence efficiency |
|---------|-----------|------------------------|
| 34 | $(C_6H_5CH=CHCOO)_{2.6}(Eu_{0.6}Ca_{0.4})$ | 88.7% |
| 35 | $(C_6H_5CH=CHCOO)_{2.6}(Eu_{0.6}Sr_{0.4})$ | 90.0% |
| 36 | $(C_6H_5CH=CHCOO)_{2.6}(Eu_{0.6}Ba_{0.4})$ | 92.4% |

EXAMPLE 37

A doped salt of terephthalic acid, [(p—$OOCC_6H_4COO)_{1.5}(Tb_{0.6}Y_{0.4})$], was obtained by following the procedure of Example 7, except that 6.065 g of cinnamic acid was substituted by 3.337 g of terephthalic acid (conjugate number=3), 2.0 g of europium chloride was substituted by 3.0 g of terbium chloride ($TbCl_3.6H_2O$; purity 99.9%), 2.893 g of lanthanum chloride was substituted by 1.625 g of yttrium chloride ($YCl_3.6H_2O$; purity 99.9%) and the quantity of sodium hydroxide was changed from 1.638 g to 1.607 g. The resultant doped salt strongly showed the green luminescence at the main emission wavelength of about 543 nm. The luminescence efficiency was 65%. When this doped salt was tested for X-ray powder diffraction, it showed crystalline diffraction pattern.

EXAMPLE 38

Terbium terephthalate, [(p—$OOCC_6H_4COO)_{1.5}Tb$], was obtained by following the procedure of Comparative Example 4, except that 6.289 g of cinnamic acid was substituted by 3.337 g of terephthalic acid (conjugate number=3), 5.0 g of lanthanum chloride was substituted by 5.0 g of terbium chloride ($TbCl_3.6H_2O$; purity 99.9%) and the quantity of sodium hydroxide was changed from 1.698 g to 1.607 g. The resultant terbium terephthalate had its maximum excitation wavelength at about 327 nm and strongly showed the green luminescence peculiar to terbium at the main emission wavelength of about 543 nm. The luminescence efficiency was 56.2%. When the doped salt was tested for X-ray powder diffraction and DSC, it showed crystalline diffraction pattern and endothermic peaks.

COMPARATIVE EXAMPLE 26

Terbium terephthalate, [(p—$OOCC_6H_4COO)_{1.5}Tb$], was obtained by following the procedure of Comparative Example 4, except that 6.289 g of cinnamic acid was substituted by 3.337 g of terephthalic acid (conjugate number=3), 5.0 g of lanthanum chloride was substituted by 5.0 g of terbium chloride ($TbCl_3.6H_2O$; purity 99.9%) and the quantity of sodium hydroxide was changed from 1.698 g to 1.607 g. Then, yttrium terephthalate, [(p—$OOCC_6H_4COO)_{1.5}Y$], was obtained by following the procedure of Comparative Example 4, except that 6.289 g of cinnamic acid was substituted by 2.225 g of terephthalic acid, 5.0 g of lanthanum chloride was substituted by 2.708 g of yttrium chloride ($YCl_3.6H_2O$; purity 99.9%) and the quantity of sodium hydroxide was changed from 1.698 g to 1.071 g. The terephthalates obtained as described above were wholly mixed by following the procedure of Comparative Example 5, to produce a physical mixture of 0.6 (terbium terephthalate) and 0.4 (yttrium terephthalate), [0.6(p—$OOCC_6H_4COO)_{1.5}Tb-0.4(p—OOCC_6H_4COO)_{1.5}Y$].

The resultant mixture showed the green luminescence at the main emission wavelength of about 543 nm. The luminescence efficiency was 30.0%. The mixture, when tested for X-ray powder diffraction, showed crystalline diffraction pattern.

EXAMPLE 39

A doped salt of isophthalic acid, [(m—$OOCC_6H_4COO)_{1.5}(Tb_{0.6}Y_{0.4})$], was obtained by following the procedure of Example 37, except that terephthalic acid was substituted by isophthalic acid (conjugate number=3). The resultant doped salt strongly showed the green luminescence peculiar to terbium at the main emission wavelength of about 543 nm. The luminescence efficiency was 58%. When it was tested for X-ray powder diffraction, it showed crystalline diffraction pattern.

COMPARATIVE EXAMPLE 27

A physical mixture of 0.6 (terbium isophthalate) and 0.4 (yttrium isophthalate), [0.6(m—$OOCC_6H_4COO)_{1.5}Tb-0.4(m—OOCC_6H_4COO)_{1.5}Y$], was obtained by following the procedure of Comparative Example 26, except that terephthalic acid was substituted by isophthalic acid (conjugate number=3). The resultant mixture showed the green luminescence at the main emission wavelength of about 543 nm. The luminescence efficiency was 28%.

When it was tested for X-ray powder diffraction, it showed crystalline diffraction pattern.

EXAMPLE 40

Terbium isophthalate, [(m—$OOCC_6H_4COO)_{1.5}Tb$], was obtained by following the procedure of Example 38, except that terephthalic acid was substituted by isophthalic acid (conjugate number=3). The resultant terbium isophthalate had its maximum excitation wavelength at about 303 nm and strongly showed the green luminescence peculiar to terbium at the main emission wavelength of about 543 nm. The luminescence efficiency of this salt was 50%. When it was tested for X-ray powder diffraction and DSC, it showed crystalline diffraction pattern and endothermic peaks.

EXAMPLE 41

A doped salt of 3,5-dimethoxycinnamic acid,

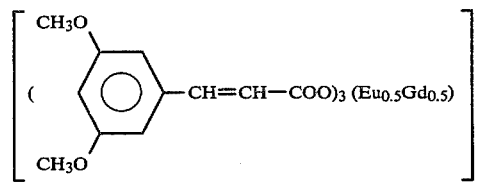

was obtained by following the procedure of Example 7, except that 6.065 g of cinnamic acid was substituted by 8.524 g of 3,5-dimethoxycinnamic acid (conjugate number=4), the quantity of europium chloride was changed from 2.0 g to 2.5 g and 2.893 g of lanthanum chloride was substituted by 2.536 g of gadolinium chloride (GdCl$_3$.6H$_2$O; purity 99.9%). The resultant doped salt strongly showed the red luminescence at the main emission wavelength of about 615 nm. The luminescence efficiency was 79%. When the salt was tested for X-ray powder diffraction, it showed crystalline diffraction pattern.

EXAMPLE 42

Europium 3,5-dimethoxycinnamate was obtained by following the procedure of Example 1-(A), except that 6.06 g of cinnamic acid was substituted by 8.524 g of 3,5-dimethoxycinnamic acid (purity 99%; conjugate number=4). The resultant europium 3,5-dimethoxycinnamate showed the red luminescence peculiar to europium at the main emission wavelength of about 616 nm. The luminescence efficiency was 70%. When it was tested for X-ray powder diffraction and DSC, it showed crystalline diffraction pattern and endothermic peaks.

EXAMPLE 43

A doped salt of β-(3-pyridyl)acrylic acid,

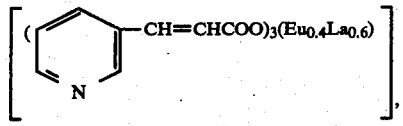

was obtained by following the procedure of Example 7, except that 6.065 g of cinnamic acid was substituted by 6.106 g of β-(3-pyridyl)acrylic acid (conjugate number=4). The resultant doped salt strongly showed the red luminescence at the main emission wavelength of about 615 nm. The luminescence efficiency was 32%. When it was tested for X-ray powder diffraction, it showed crystalline diffraction pattern.

EXAMPLE 44

Europium β-(3-pyridyl)acrylate was obtained by following the procedure of Example 1-(A), except that 6.06 g of cinnamic acid was substituted by 6.106 g of β-(3-pyridyl)acrylic acid (conjugate number=4). The resultant europium β-(3-pyridyl)acrylate showed the red luminescence peculiar to europium at the main emission wavelength of about 616 nm. The luminescence efficiency was 30%. When it was tested for X-ray powder diffraction and DSC, it showed crystalline diffraction pattern and endothermic peaks.

EXAMPLE 45

A sodium 2-thiophenecarboxylate aqueous solution was obtained by dissolving 1.64 g of sodium hydroxide in 300 ml of purified water and then under stirring, adding 5.25 g of 2-thiophenecarboxylic acid (purity 99%; conjugate number=3) in the resultant aqueous solution until thorough solution. Then, a europium chloride aqueous solution obtained by thoroughly dissolving 5.0 g of europium chloride (EuCl$_3$.6H$_2$O; purity 99.99%) in 50 ml of purified water was gradually added while under stirring to the aforementioned sodium 2-thiophenecarboxylate aqueous solution at room temperature. The resultant reaction solution was adjusted to pH 5.0 with 0.1 N hydrochloric acid and then stirred thoroughly. Subsequently, the aqueous solution was evaporated to afford europium 2-thiophenecarboxylate

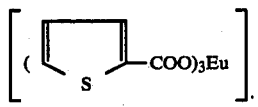

The europium 2-thiophenecarboxylate thus obtained was dried in vacuo at 80° to 100° C. for 20 to 24 hours. This salt had its maximum excitation wavelength at about 340 nm and strongly showed the red luminescence peculiar to europium at the main emission wavelength of about 616 nm. The luminescence efficiency was 31%. When it was tested for X-ray powder diffraction and DSC, it showed crystalline diffraction pattern and endothermic peaks.

EXAMPLE 46

Europium 3-thiophenecarboxylate,

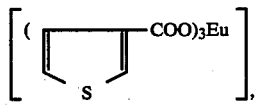

was obtained by following the procedure of Example 45, except that 2-thiophenecarboxylic acid was substituted by 3-thiophenecarboxylic acid (conjugate number=3). This salt showed the red luminescence peculiar to europium at the main emission wavelength of about 615 nm. The luminscence efficiency was 33%. When it was tested for X-ray powder diffraction and DSC, it showed crystalline diffraction pattern and endothermic peaks.

EXAMPLE 47

Terbium picolinate,

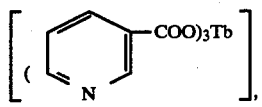

was obtained by following the procedure of Example 45, except that 2-thiophenecarboxylic acid was substituted by 5.04 g of picolinic acid (conjugate number=3) and 5.0 g of europium chloride was substituted by 5.095 g of terbium chloride (TbCl$_3$.6H$_2$O; purity 99.9%). The salt had its optimum excitation wavelength at about 318 nm and strongly showed the green luminescence peculiar to terbium at the main emission wavelength of about 543 nm. The luminescence efficiency was 54.5%. When it was tested for X-ray powder diffraction and DSC, it showed crystalline diffraction pattern and endothermic peaks.

COMPARATIVE EXAMPLE 28

Europium sorbate, [(CH$_3$CH=CHCH=CHCOO)$_3$Eu], was obtained by following the procedure of Example 1-(A), except that 6.06 g of cinnamic acid was substituted by 4.59 g of sorbic acid (purity 99.9%; conjugate number=2). The resultant europium sorbate showed its maximum excitation wavelength at about 393 nm. It weakly showed the red luminescence peculiar to europium. The luminescence efficiency was 0.6%. When it was tested for X-ray powder diffraction and DSC, it showed crystalline diffraction pattern and endothermic peaks. The peaks of the infrared spectrum were as shown below.

3010 cm$^{-1}$(w), 2970 cm$^{-1}$(w), 2920 cm$^{-1}$(w), 1650 cm$^{-1}$(m) 1615 cm$^{-1}$(m), 1520 cm$^{-1}$(s), 1400 cm$^{-1}$(vs), 1285 cm$^{-1}$(m) 1215 cm$^{-1}$(w), 1160 cm$^{-1}$(w), 1000 cm$^{-1}$(m), 925 cm$^{-1}$(w) 880 cm$^{-1}$(w), 810 cm$^{-1}$(w), 745 cm$^{-1}$(w).

COMPARATIVE EXAMPLE 29

Europium diphenylacetate, $\{[(C_6H_5)_2CHCOO]_3Eu\}$, was obtained by following the procedure of Example 1-(A), except that 6.06 g of cinnamic acid was substituted by 8.69 g of diphenylacetic acid (purity 99.9%; conjugate number=0). The resultant salt had its maximum excitation wavelength at about 392 nm and weakly showed the red luminescence peculiar to europium. The luminescence efficiency was 0.3%.

When the salt was tested for X-ray powder diffraction and DSC, it showed crystalline diffraction pattern and endothermic peaks. The peaks in the infrared spectrum were as shown below.

3050 cm$^{-1}$(w), 3025 cm$^{-1}$(w), 1560 cm$^{-1}$(s), 1495 cm$^{-1}$(w) 1450 cm$^{-1}$(w), 1410 cm$^{-1}$(s), 1260 cm$^{-1}$(w), 1080 cm$^{-1}$(w) 1030 cm$^{-1}$(w), 800 cm$^{-1}$(w), 760 cm$^{-1}$(w), 700 cm$^{-1}$(m)

COMPARATIVE EXAMPLE 30

Europium 2-ethylhexanoate, $\{[C_4H_9CH(C_2H_5)COO]_3Eu\}$, was obtained by following the procedure of Example 1-(A), except that 6.06 g of cinnamic acid was substituted by 5.90 g of 2-ethylhexanoic acid (purity 99.9%; conjugate number=0). The resultant salt had its maximum excitation wavelength at about 393 nm. It weakly showed the red luminescence peculiar to europium. The luminescence efficiency was 0.9%. When it was tested for X-ray powder diffraction and DSC, it showed crystalline diffraction pattern and endothermic peaks. The peaks in the infrared spectrum were as shown below.

2960 cm$^{-1}$(s), 2940 cm$^{-1}$(s), 2875 cm$^{-1}$(m), 1540 cm$^{-1}$(vs) 1460 cm$^{-1}$(sh), 1420 cm$^{-1}$(s), 1380 cm$^{-1}$(w), 1320 cm$^{-1}$(m) 1300 cm$^{-1}$(sh), 1260 cm$^{-1}$(w), 1240 cm$^{-1}$(w), 1210 cm$^{-1}$(w) 1120 cm$^{-1}$(w), 955 cm$^{-1}$(w), 815 cm$^{-1}$(m), 730 cm$^{-1}$(w)

COMPARATIVE EXAMPLE 31

A doped salt of sorbic acid, $[(CH_3CH=CHCH=CHCOO)_3 (Eu_{0.4}La_{0.6})]$, was obtained by following the procedure of Example 7, except that 6.065 g of cinnamic acid was substituted by 4.590 g of sorbic acid (conjugate number=2). The resultant doped salt weakly showed the red luminescence. The luminescence efficiency was 0.6%. When it was tested for X-ray powder diffraction, it showed crystalline diffraction pattern.

COMPARATIVE EXAMPLE 32

A doped salt of diphenylacetic acid, $\{[(C_6H_5)_2CHCOO]_3(Eu_{0.4}La_{0.6})\}$, was obtained by following the procedure of Example 7, except that 6.065 g of cinnamic acid was substituted by 8.689 g of diphenylacetic acid (conjugate number=0). The resultant doped salt weakly showed the red luminescence. The luminescence efficiency was 0.3%. When it was tested for X-ray powder diffraction, it showed crystalline diffraction pattern.

COMPARATIVE EXAMPLE 33

A doped salt of 2-ethylhexanoic acid, $\{[C_4H_9CH(C_2H_5)COO]_3(Eu_{0.4}La_{0.6})\}$, was obtained by following the procedure of Example 7, except that 6.065 g of cinnamic acid was substituted by 5.904 g of 2-ethylhexanoic acid (conjugate number=0). The resultant doped salt weakly showed the red luminescence. The luminescence efficiency was 0.96%. When it was tested for X-ray powder diffraction, it showed crystalline diffraction pattern.

EXAMPLE 48

The europium cinnamate obtained in Example 1-(A) was applied to a NESA glass plate and exposed to the electron beam emitted at an accelerated potential of 5000 V by use of an electron beam accelerator. The europium cinnamate on the glass produced the red luminescence peculiar to europium.

EXAMPLE 49

The doped salt of cinnamic acid, $[(C_6H_5CH=CHCOO)_3(Eu_{0.4}La_{0.6})]$, obtained in Example 7 was applied to a NESA glass plate and was exposed to the electron beam emitted at an accelerated potential of 5000 V by use of an electron beam accelerator. The doped salt on the glass produced the red luminescence peculiar to europium.

EXAMPLE 50

Figure 3:
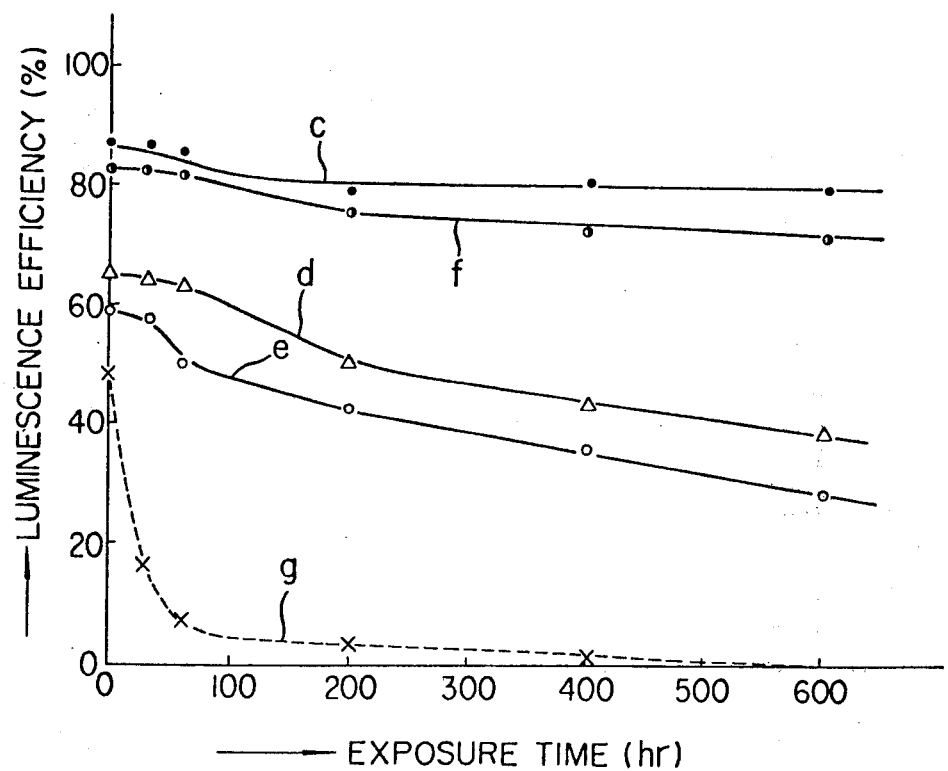
FIG. 3 is a graph showing the relations between the exposure time and the luminescence efficiency determined of $(C_6H_5CH=CHCOO)_3(Eu_{0.4}La_{0.6})$ (the curve c in the graph), $(p-OOCC_6H_4COO)_{1.5}(Tb_{0.7}Gd_{0.3})$ (the curve d in the graph), $(p-CH_3C_6H_4COO)_3(Tb_{0.6}Y_{0.4})$ (the curve e in the graph) and $(C_6H_5CH=CHCOO)_3Eu$ (the curve f in the graph) indicated in Example 50 and Eu(TTA) (the curve g in the graph) indicated in Comparative Example 34.

The doped salt of cinnamic acid $[(C_6H_5CH=CHCOO)_3(Eu_{0.4}La_{0.6})]$ obtained in Example 7, the doped salt of p-toluic acid $[(p-CH_3C_6H_4COO)_3(Tb_{0.7}Gd_{0.3})]$ obtained in Example 28, the doped salt of terephthalic acid $[(p-OOCC_6H_4COO)_3(Tb_{0.6}Y_{0.4})]$ obtained in Example 37 and the europium cinnamate $[(C_6H_5CH=CHCOO)_3Eu]$ obtained in Example 1-(A) were left to stand in a Sunshine weather-meter at 60° C. to study time-course change of the luminescence efficiency. The results are shown in Table 18 and the curve c, e, d and f in FIG. 3, respectively.

TABLE 18

| Sample | Weatherability of luminescence efficiency | | | | | | |
|---|---|---|---|---|---|---|---|
| | Exposure time | | | | | | |
| | 0 | 30 | 60 | 200 | 400 | 600 | (hr) |
| $(C_6H_5CH=CHCOO)_3(Eu_{0.4}La_{0.6})$ | 86 | 86 | 85 | 79 | 80 | 79 | |
| $(p-CH_3C_6H_4COO)_3(Tb_{0.7}Gd_{0.3})$ | 58.2 | 57 | 50 | 42 | 35 | 28 | |
| $(p-OOCC_6H_4COO)_{1.5}(Tb_{0.6}Y_{0.4})$ | 65 | 64 | 63 | 50 | 43 | 38 | |
| $(C_6H_5CH=CHCOO)_3Eu$ | 82 | 82 | 81 | 75 | 72 | 71 | (%) |

COMPARATIVE EXAMPLE 34

In 400 ml of anhydrous ethanol, 16.0 g of 2-thenoyltrifluoreoacetone and 5.0 g of anhydrous europium chloride were dissolved. Then an anhydrous ethanol solution of sodium ethoxide was gradually added, while under stirring, to the resultant solution until the pH value thereof was adjusted to pH 6. The stirring of the solution was further continued for one hour. The solution thus obtained was evaporated to a total volume of 70 ml, cooled and left to stand for two days. Consequently, the europium thenoyltrifluoroacetate chelate, [EU(TTA)], was educed. The chelate was separated by means of a glass filter, washed with ligroin and then dried in vacuo at 50° C. for 20 to 24 hours.

The Eu(TTA) chelate obtained by the procedure described above was left to stand in a Sunshine weather-meter at 60° C. to study time-course change of the luminescence efficiency. The results are shown in Table 19 and the curve g in FIG. 3.

TABLE 19

| Exposure time | 0 | 30 | 60 | 200 | 400 | 600 | (hr) |
|---|---|---|---|---|---|---|---|
| Luminescence efficiency | 48 | 16.5 | 7 | 3.5 | 0.7 | ~0 | (%) |

EXAMPLE 51

In 200 ml of chloroform, 10 g of polymethacrylic resin was dissolved. Then in the resultant solution, 0.5 g of the europium cinnamate obtained in Example 1-(A) was homogeneously dispersed. The mixture was pelletized and dried.

By compression molding the pellets at 180° C., there was obtained a luminescent europium cinnamate-containing polymethacrylic sheet 2 mm in thickness. When this sheet was exposed to an ultraviolet ray, it clearly showed the red luminescence peculiar to europium very strongly.

What is claimed is:

1. An organic rare-earth salt phosphor comprising a crystalline rare-earth metal salt of an organic acid represented by the general formula:

$$[A(COO)_l]_m Z$$

wherein:
$[A(COO)_l]$ denotes a carboxylic acid radical derived from an organic carboxylic acid $[A(COOH)_l]$ selected from the group consisting of cinnamic acid, 3-5-dimethoxycinnamic acid and beta-(pyridyl) acrylic acid,
Z is europium,
l denotes 1 or 2, and
m = 3/l.

2. The organic rare-earth salt phosphor according to claim 1, wherein the organic carboxylic acid is cinnamic acid.

3. The organic rare-earth salt phosphor according to claim 1, wherein the organic carboxylic acid is 3,5-dimethoxycinnamic acid.

4. The organic rare-earth salt phosphor according to claim 1, wherein the organic carboxylic acid is beta(3-pyridyl)acrylic acid.

* * * * *